United States Patent
Wu et al.

(10) Patent No.: US 10,856,141 B2
(45) Date of Patent: Dec. 1, 2020

(54) SECURITY PROTECTION NEGOTIATION METHOD AND NETWORK ELEMENT

(71) Applicant: HUAWEI TECHNOLOGIES CO., LTD., Shenzhen (CN)

(72) Inventors: Rong Wu, Shenzhen (CN); Bo Zhang, Shenzhen (CN); Lu Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/520,369

(22) Filed: Jul. 24, 2019

(65) Prior Publication Data

US 2019/0349763 A1     Nov. 14, 2019

Related U.S. Application Data

(63) Continuation of application No. PCT/CN2017/097671, filed on Aug. 16, 2017.

(30) Foreign Application Priority Data

Jan. 24, 2017    (CN) .......................... 2017 1 0060035

(51) Int. Cl.
     *H04L 29/06*         (2006.01)
     *H04W 12/00*        (2009.01)
     (Continued)

(52) U.S. Cl.
     CPC ....... *H04W 12/0013* (2019.01); *H04L 63/205* (2013.01); *H04W 12/0027* (2019.01);
     (Continued)

(58) Field of Classification Search
     None
     See application file for complete search history.

(56) References Cited

U.S. PATENT DOCUMENTS

2009/0298471 A1* 12/2009 He .................... H04W 12/1202
                                                                   455/411
2010/0263040 A1* 10/2010 Norrman ................. H04L 63/12
                                                                    726/13
(Continued)

FOREIGN PATENT DOCUMENTS

| CN | 101001252 A | 7/2007 |
|---|---|---|
| CN | 101072092 A | 11/2007 |

(Continued)

OTHER PUBLICATIONS

3GPP TS 33.401 v9.3.1 (Apr. 2010),3rd Generation Partnership Project;Technical Specification Group Services and System Aspects;3GPP System Architecture Evolution (SAE);Security architecture(Release 9),total 104 pages.

(Continued)

*Primary Examiner* — Maung T Lwin
(74) *Attorney, Agent, or Firm* — Kilpatrick Townsend & Stockton LLP

(57) ABSTRACT

A security protection negotiation method and a network element are disclosed, to implement, based on a 5G network architecture, negotiation between UE and a UPF to start user plane security protection for a current session. The method includes: determining, by an SMF, security protection information used on a user plane in a current session process; sending, by the SMF to UE, a first message including the security protection information used on the user plane; performing, by the UE, integrity protection authentication on the first message based on the security protection information used on the user plane; when the authentication performed by the UE on the first message succeeds, starting, by the UE, user plane security protection, and sending, to the SMF, a second message used to indicate that the authentication performed by the UE on the first message succeeds.

17 Claims, 37 Drawing Sheets

(51) Int. Cl.
  *H04W 76/18* (2018.01)
  *H04W 12/04* (2009.01)
  *H04W 12/10* (2009.01)
(52) U.S. Cl.
  CPC ... *H04W 12/0401* (2019.01); *H04W 12/0403* (2019.01); *H04W 12/04033* (2019.01); *H04W 12/1006* (2019.01); *H04W 76/18* (2018.02)

(56) References Cited

U.S. PATENT DOCUMENTS

| | | | | |
|---|---|---|---|---|
| 2013/0236016 | A1* | 9/2013 | Zhang | H04L 63/205 380/270 |
| 2013/0254531 | A1* | 9/2013 | Liang | H04W 12/0605 713/151 |
| 2016/0006707 | A1* | 1/2016 | Ying | H04L 9/0838 713/153 |
| 2016/0006726 | A1* | 1/2016 | Mizikovsky | H04L 63/061 713/171 |
| 2017/0013453 | A1* | 1/2017 | Lee | H04W 12/0017 |
| 2017/0187691 | A1* | 6/2017 | Lee | H04L 41/08 |
| 2019/0116499 | A1* | 4/2019 | Wifvesson | H04W 12/04031 |

FOREIGN PATENT DOCUMENTS

| | | |
|---|---|---|
| CN | 101355809 A | 1/2009 |
| CN | 101505479 A | 8/2009 |
| CN | 101873586 A | 10/2010 |
| CN | 104796887 A | 7/2015 |
| WO | 2017011114 A1 | 1/2017 |
| WO | 2018079690 A1 | 5/2018 |

OTHER PUBLICATIONS

3GPP TR 33.899 v0.6.0 (Nov. 2016),3rd Generation Partnership Project;Technical Specification Group Services and System Aspects;Study on the security aspects of the next generation system(Release 14),total 376 pages.

Huawei et al.,"introduce algorithms negotiation call flow",3GPP TSG SA WG3 (Security) Meeting #85 S3-162036 (revision of 53-161672), Nov. 7-11, 2016 Santa Cruz de Tenerife (Spain),total 3 pages.

* cited by examiner

SECURITY PROTECTION NEGOTIATION METHOD AND NETWORK ELEMENT

CROSS-REFERENCE TO RELATED APPLICATIONS

This application is a continuation of International Application No. PCT/CN2017/097671, filed on Aug. 16, 2017, which claims priority to Chinese Patent Application No. 201710060035.8, filed on Jan. 24, 2017. The disclosures of the aforementioned applications are hereby incorporated by reference in their entireties.

TECHNICAL FIELD

Embodiments of the present disclosure relate to the wireless communications field, and in particular, to a security protection negotiation method and a network element.

BACKGROUND

Currently, compared with a network architecture in 3rd Generation Partnership Project (3rd Generation Partnership Project, 3GPP) 2G/3G/4G, a new network architecture is proposed in 3GPP 5G, and a session setup process is proposed based on the 5G network architecture. However, in a current standard, no security protection negotiation technical solution is proposed for the 5G network architecture. Security protection negotiation is a process in which two parties that perform security protection negotiate and synchronize security protection keys and security protection algorithms at respective security layers, and start security protection.

A 5G user plane connection is established based on a session. However, a security protection negotiation technical solution proposed in 2G/3G/4G is not based on a session granularity and does not consider a security requirement of a service. Consequently, the security protection negotiation technical solution proposed in 2G/3G/4G cannot meet a requirement of the 5G network architecture.

In conclusion, there is an urgent need to design a security protection negotiation technical solution for the 5G network architecture.

SUMMARY

Embodiments of the present disclosure provide a security protection negotiation method and a network element, to implement, based on a 5G network architecture, negotiation between UE and a UPF to start user plane security protection for a current session.

According to a first aspect, an embodiment of this disclosure provides a security protection negotiation method, including:

determining, by a session management function SMF, security protection information used on a user plane in a current session process, where the security protection information includes a security protection algorithm, an index used to identify a security protection context, and a message authentication code, the security protection includes encryption and decryption protection and integrity protection, and the message authentication code is an authentication code generated after the SMF performs integrity protection on a first message by using an integrity protection algorithm and an integrity protection key that is included in the security protection context identified by using the index;

sending, by the SMF to the UE, the first message including the security protection information used on the user plane, where the security protection information used on the user plane is used by the UE to start user plane security protection after integrity protection authentication performed by the UE on the first message based on the security protection information used on the user plane succeeds; and receiving, by the SMF, a second message that is sent by the UE and that is used to indicate that the authentication performed by the UE on the first message succeeds, and sending, to a user plane function UPF, a third message including the security protection algorithm and the security protection context that are used on the user plane in the current session process, where the third message is used to trigger the UPF to start user plane security protection based on the security protection algorithm and the security protection context.

The security protection information used on the user plane in the current session process includes the following information: an encryption and decryption protection algorithm used on the user plane in the current session process, the integrity protection algorithm used on the user plane in the current session process, an index for identifying an encryption and decryption protection context used on the user plane in the current session process, an index for identifying an integrity protection context used on the user plane in the current session process, and the message authentication code.

In the method, the SMF determines the security protection information used on the user plane in the current session process and sends the security protection information to the UE. The security protection information includes the security protection algorithm, the index for identifying the security protection context, the message authentication code, and the like. After the UE successfully authenticates, the UE starts the user plane security protection. After determining that the authentication performed by the UE succeeds, the SMF triggers the UPF to start the user plane security protection. In this way, the UE and the UPF negotiate to start respective user plane security protection. Because a user plane connection in a 5G network architecture is set up based on a session, and according to the method, the UE and the UPF can negotiate to start respective session granularity-based user plane security protection, the method can meet a requirement of the 5G network architecture for user plane security protection.

In a possible implementation, the SMF may determine the security protection algorithm in the following two modes:

In mode 1, the SMF obtains, from a security policy control function SPCF, the security protection algorithm determined by the SPCF through negotiation.

In mode 2, the SMF autonomously determines the security protection algorithm through negotiation.

In the foregoing two modes, the SPCF is deployed on any one of the SMF, a security anchor function (SEAF), and an authentication server function (AUSF), or the SPCF is independently deployed on a network.

Regardless of the manner 1 or the manner 2, the security protection algorithm is determined through negotiation based on a security protection algorithm supported by the UE, a security protection algorithm supported by the network, and a security protection algorithm supported by a service to which a current session belongs.

In this way, the SMF can determine, in either of the foregoing two modes, the security protection algorithm used on the user plane in the current session process. The security protection algorithm includes the encryption and decryption protection algorithm and the integrity protection algorithm.

In a possible implementation, before the SMF determines the security protection information used on the user plane, the SMF sets up the current session.

In this case, the security protection negotiation method is performed after the current session is set up.

In a possible implementation, before the SMF determines the security protection information used on the user plane, the SMF receives a session setup request message that is sent by the UE and that is used to request to set up the current session; and the sending, by the SMF to the UE, the first message including the security protection information used on the user plane includes: sending, by the SMF to the UE, a session establishment complete message including the security protection information used on the user plane.

In this case, the security protection negotiation method is performed in a process of setting up the current session.

When the security protection negotiation method is performed in the process of setting up the current session, after receiving the session setup request message that is sent by the UE and that is used to request to set up the current session, the SMF determines that a security termination point of the user plane is the UPF, and notifies a radio access network RAN that the SMF performs the security protection negotiation method.

The termination point of the user plane is a network element that needs to start user plane security protection other than the UE.

It should be noted that in this embodiment of this application, the termination point of the user plane may be alternatively a gNB. It may be understood that the gNB is a network element of the RAN. When the termination point of the user plane is the gNB, the security protection negotiation method includes: After the SMF receives the session setup request message that is sent by the UE and that is used to request to set up the current session, the SMF determines that the termination point of the user plane is the gNB. The SMF sends a notification message to the RAN, where the notification message is used to instruct the RAN to perform a user plane security protection negotiation process between the UE and the gNB. After receiving the notification message, the RAN returns acknowledgement information to the SMF. The UE and the gNB perform user plane security protection negotiation.

When the termination point of the user plane is the gNB, the UE may have completed user plane security protection negotiation by using a security protection negotiation procedure between the UE and the gNB during initial access.

In this way, according to the method, the UE and the gNB can negotiate to start respective user plane security protection.

In a possible implementation, after the sending, by the SMF to the UE, the first message including the security protection information used on the user plane, the method further includes:

receiving, by the SMF, a fourth message that is sent by the UE and that is used to indicate that the authentication performed by the UE on the first message fails; and determining, by the SMF according to an indication of the fourth message, that the UPF does not need to be triggered to start the user plane security protection.

In this way, after determining that the authentication performed by the UE on the first message fails, the SMF determines to end the current security protection negotiation process.

According to a second aspect, an embodiment of this disclosure provides a security protection negotiation method. The method includes:

receiving, by user equipment UE, a first message that is sent by a session management function (SMF) and that includes security protection information used on a user plane in a current session process, where the security protection information includes a security protection algorithm, an index used to identify a security protection context, and a message authentication code, the security protection includes encryption and decryption protection and integrity protection, and the message authentication code is an authentication code generated after the SMF performs integrity protection on the first message by using an integrity protection algorithm and an integrity protection key that is included in the security protection context identified by using the index;

performing, by the UE, authentication on the first message based on the security protection information used on the user plane; and when the authentication performed by the UE on the first message succeeds, starting, by the UE, user plane security protection, and sending, to the SMF, a second message used to indicate that the authentication performed by the UE on the first message succeeds.

In the method, after receiving the first message that is sent by the SMF and that includes the security protection information used on the user plane in the current session process, the UE performs authentication on the first message based on the security protection information used on the user plane in the current session process. When the authentication performed by the UE on the first message succeeds, the UE starts the user plane security protection, and sends, to the SMF, the second message used to indicate that the authentication performed by the UE on the first message succeeds. Then, after receiving the second message, the SMF triggers a UPF to start user plane security protection. Therefore, according to the method, the UE and the UPF can negotiate to start respective user plane security protection. Because a user plane connection in a 5G network architecture is set up based on a session, and according to the method, the UE and the UPF can negotiate to start respective session granularity-based user plane security protection, the method can meet a requirement of the 5G network architecture for user plane security protection.

In a possible implementation, starting, by the UE, the user plane security protection, and sending, to the SMF, the second message used to indicate that the authentication performed by the UE on the first message is successful includes:

starting, by the UE, user plane encryption and decryption protection and integrity protection, and then sending, to the SMF, the second message used to indicate that the authentication performed by the UE on the first message succeeds.

In this way, the UE may start the encryption and decryption protection and the integrity protection at a same time.

In a possible implementation, the starting, by the UE, user plane security protection, and sending, to the SMF, a second message used to indicate that the authentication performed by the UE on the first message is successful includes:

starting, by the UE, user plane downlink decryption protection and integrity protection, then sending, to the SMF, the second message used to indicate that the authentication performed by the UE on the first message succeeds, and finally starting user plane uplink encryption protection.

In this way, the UE may start the downlink decryption protection, the integrity protection, and the uplink encryption protection at different times.

In a possible implementation, after performing, by the UE, authentication on the first message based on the security protection information used on the user plane, the method further includes:

when the authentication performed by the UE on the first message fails, determining, by the UE, not to start the user plane security protection, and sending, to the SMF, a fourth message indicating that the authentication performed by the UE on the first message fails.

In this way, when the authentication performed by the UE on the first message fails, the current security protection negotiation process ends.

According to a third aspect, an embodiment of this disclosure provides a security protection negotiation method, including:

receiving, by a user plane function (UPF), a third message that is sent by a session management function (SMF) and that includes a security protection algorithm and a security protection context that are used on a user plane in a current session process, where the third message is used to instruct the UPF to start user plane security protection based on the security protection algorithm and the security protection context, and the security protection includes encryption and decryption protection and integrity protection; and starting, by the UPF, the user plane security protection according to an instruction of the third message.

In the method, when the UPF receives the third message that is sent by the SMF and that includes the security protection algorithm and the security protection context that are used on the user plane in the current session process, it indicates that authentication performed by UE succeeds, and after the authentication succeeds, the UE starts user plane security protection. Therefore, after receiving the third message sent by the SMF, the UPF needs to start the user plane security protection according to the instruction of the third message. In this way, the UE and the UPF negotiate to start respective user plane security protection. Because a user plane connection in a 5G network architecture is set up based on a session, and according to the method, the UE and the UPF can negotiate to start respective session granularity-based user plane security protection, the method can meet a requirement of the 5G network architecture for user plane security protection.

In a possible implementation, the receiving, by a UPF, a third message that is sent by an SMF and that includes a security protection algorithm and a security protection context that are used on a user plane in a current session process includes:

after the SMF determines that the UE starts user plane security protection, receiving, by the UPF, the third message sent by the SMF.

In this way, the UPF may start the user plane security protection at a same time. To be specific, after the SMF determines that the UE starts the user plane security protection, the UPF receives the third message sent by the SMF, and starts the user plane security protection. The security protection includes downlink encryption protection, integrity protection, and uplink decryption protection.

In a possible implementation, the receiving, by a UPF, a third message that is sent by an SMF and that includes a security protection algorithm and a security protection context that are used on a user plane in a current session process includes:

after the SMF sends, to the UE, security protection information used on the user plane in the current session process, receiving, by the UPF, a first trigger message sent by the SMF, where the first trigger message is used to trigger the UPF to start user plane downlink encryption protection and integrity protection; and after the SMF determines that the UE starts user plane security protection, receiving, by the UPF, a second trigger message sent by the SMF, where the second trigger message is used to trigger the UPF to start user plane uplink decryption protection.

In this way, the UPF may start the user plane security protection on different occasions. To be specific, after the SMF sends, to the UE, the security protection information used on the user plane in the current session process, the UPF receives the first trigger message sent by the SMF, and starts the downlink encryption protection and the integrity protection. After the SMF determines that the UE starts the user plane security protection, the UPF receives the second trigger message sent by the SMF, and starts the uplink decryption protection.

According to a fourth aspect, an embodiment of this disclosure provides a session management function (SMF). The SMF includes:

a processing unit configured to determine security protection information used on a user plane in a current session process, where the security protection information includes a security protection algorithm, an index used to identify a security protection context, and a message authentication code, the security protection includes encryption and decryption protection and integrity protection, and the message authentication code is an authentication code generated after integrity protection is performed on a first message by using an integrity protection algorithm and an integrity protection key that is included in the security protection context identified by using the index;

a sending unit configured to send, to the UE, the first message including the security protection information that is determined by the processing unit and that is used on the user plane, where the security protection information used on the user plane is used by the UE to start user plane security protection after integrity protection authentication performed by the UE on the first message based on the security protection information used on the user plane succeeds; and a receiving unit configured to receive a second message that is sent by the UE and that is used to indicate that the authentication performed by the UE on the first message succeeds, where the sending unit is further configured to send, to a user plane function UPF, a third message including the security protection algorithm and the security protection context that are determined by the processing unit and that are used on the user plane in the current session process, where the third message is used to trigger the UPF to start user plane security protection based on the security protection algorithm and the security protection context.

In a possible implementation, when determining the security protection algorithm, the processing unit is specifically configured to:

obtain, from a security policy control function (SPCF), the security protection algorithm determined by the SPCF through negotiation; or autonomously determine the security protection algorithm through negotiation.

In a possible implementation, the SPCF is deployed on any one of the SMF, a security anchor function SEAF, and an authentication server function AUSF, or the SPCF is independently deployed on a network.

In a possible implementation, the security protection algorithm is determined through negotiation based on a security protection algorithm supported by the UE, a security protection algorithm supported by the network, and a security protection algorithm supported by a service to which a current session belongs.

In a possible implementation, the processing unit is further configured to set up the current session before determining the security protection information used on the user plane; or the receiving unit is further configured to: before the processing unit determines the security protection information used on the user plane, receive a session setup request message that is sent by the UE and that is used to request to set up the current session; and when sending, to the UE, the first message including the security protection information used on the user plane, the sending unit is specifically configured to send, to the UE, a session setup complete message including the security protection information used on the user plane.

In a possible implementation, the processing unit is further configured to: after the receiving unit receives the session setup request message that is sent by the UE and that is used to request to set up the current session, determine that a security termination point of the user plane is the UPF; and the sending unit is further configured to: after the processing unit determines that the security termination point of the user plane is the UPF, send, to a radio access network RAN, a notification message used to instruct the SMF to perform the security protection negotiation method.

In a possible implementation, the receiving unit is further configured to: after the sending unit sends, to the UE, the first message including the security protection information used on the user plane, receive a fourth message that is sent by the UE and that is used to indicate that the authentication performed by the UE on the first message fails; and the processing unit is further configured to determine, according to an indication of the fourth message received by the receiving unit, that the UPF does not need to be triggered to start the user plane security protection.

According to a fifth aspect, an embodiment of this disclosure provides an SMF, including a processor, a memory, and a transceiver, where the transceiver is configured to: receive data and send data;

the memory is configured to store an instruction; and the processor is configured to execute the instruction in the memory, to perform the method provided in the first aspect.

According to a sixth aspect, an embodiment of this disclosure further provides a computer storage medium, configured to store a computer software instruction used by the SMF in the foregoing aspects, where the computer software instruction includes a program designed for executing the foregoing aspects.

According to a seventh aspect, an embodiment of this disclosure provides user equipment UE. The IE includes:

a receiving unit configured to receive a first message that is sent by a session management function SMF and that includes security protection information used on a user plane in a current session process, where the security protection information includes a security protection algorithm, an index used to identify a security protection context, and a message authentication code, the security protection includes encryption and decryption protection and integrity protection, and the message authentication code is an authentication code generated after the SMF performs integrity protection on the first message by using an integrity protection algorithm and an integrity protection key that is included in the security protection context identified by using the index;

a processing unit configured to: perform authentication on the first message based on the security protection information that is received by the receiving unit and that is used on the user plane, and when the authentication on the first message succeeds, start user plane security protection of the UE; and a sending unit configured to: when the authentication performed by the processing unit on the first message succeeds, send, to the SMF, a second message used to indicate that the authentication performed by the UE on the first message succeeds.

In a possible implementation, when starting the user plane security protection, the processing unit is specifically configured to: start user plane encryption and decryption protection and integrity protection, and then control the sending unit to send the second message to the SMF; or when starting the user plane security protection, the processing unit is specifically configured to: start user plane downlink decryption protection and integrity protection, then control the sending unit to send the second message to the SMF, and finally start user plane uplink encryption protection.

In a possible implementation, after authentication is performed on the first message based on the security protection information used on the user plane, the processing unit is further configured to: when the authentication on the first message fails, determine not to start the user plane security protection; and the sending unit is further configured to: when the authentication performed by the processing unit on the first message fails, send, to the SMF, a fourth message used to indicate that the authentication performed by the UE on the first message fails.

According to an eighth aspect, an embodiment of this disclosure provides UE, including a processor, a memory, and a transceiver, where the transceiver is configured to: receive data and send data;

the memory is configured to store an instruction; and the processor is configured to execute the instruction in the memory, to perform the method provided in the second aspect.

According to a ninth aspect, an embodiment of this disclosure further provides a computer storage medium, configured to store a computer software instruction used by the UE in the foregoing aspects, where the computer software instruction includes a program designed for executing the foregoing aspects.

According to a tenth aspect, an embodiment of this disclosure provides a user plane function UPF. The UPF includes:

a receiving unit configured to receive a third message that is sent by a session management function SMF and that includes a security protection algorithm and a security protection context that are used on a user plane in a current session process, where the third message is used to instruct the UPF to start user plane security protection based on the security protection algorithm and the security protection context, and the security protection includes encryption and decryption protection and integrity protection; and a processing unit configured to start the user plane security protection according to an instruction of the third message received by the receiving unit.

In a possible implementation, when receiving the third message that is sent by the SMF and that includes the security protection algorithm and the security protection context that are used on the user plane in the current session process, the receiving unit is specifically configured to:

after the SMF determines that the UE starts user plane security protection, receive the third message sent by the SMF; or after the SMF sends, to the UE, security protection information used on the user plane in the current session process, receive a first trigger message sent by the SMF, where the first trigger message is used to trigger the UPF to start user plane downlink encryption protection and integrity protection; and after the SMF determines that the UE starts user plane security protection, receive a second trigger message sent by the SMF, where the second trigger message is used to trigger the UPF to start user plane uplink decryption protection.

According to an eleventh aspect, an embodiment of this disclosure provides a UPF, including a processor, a memory, and a transceiver, where the transceiver is configured to: receive data and send data;

the memory is configured to store an instruction; and the processor is configured to execute the instruction in the memory, to perform the method provided in the first aspect.

According to a twelfth aspect, an embodiment of this disclosure further provides a computer storage medium, configured to store a computer software instruction used by the UPF in the foregoing aspects, where the computer software instruction includes a program designed for executing the foregoing aspects.

DESCRIPTION OF EMBODIMENTS

The following clearly describes the technical solutions in the embodiments of this application with reference to the accompanying drawings in the embodiments of this application.

Figure 1:
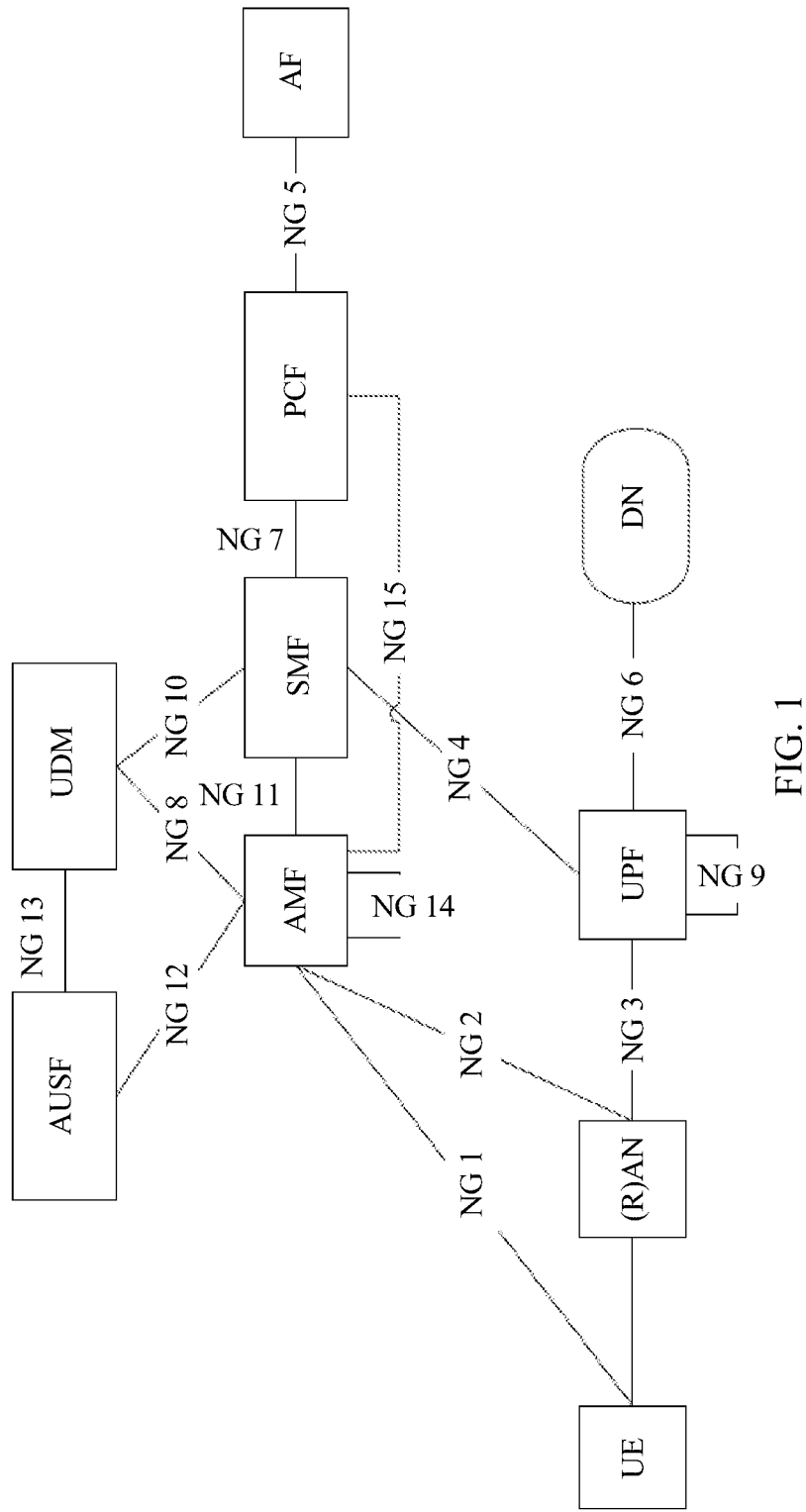
FIG. 1 is a schematic diagram of a 5G network architecture that can be applied to embodiments of the present disclosure.
Figure 2:
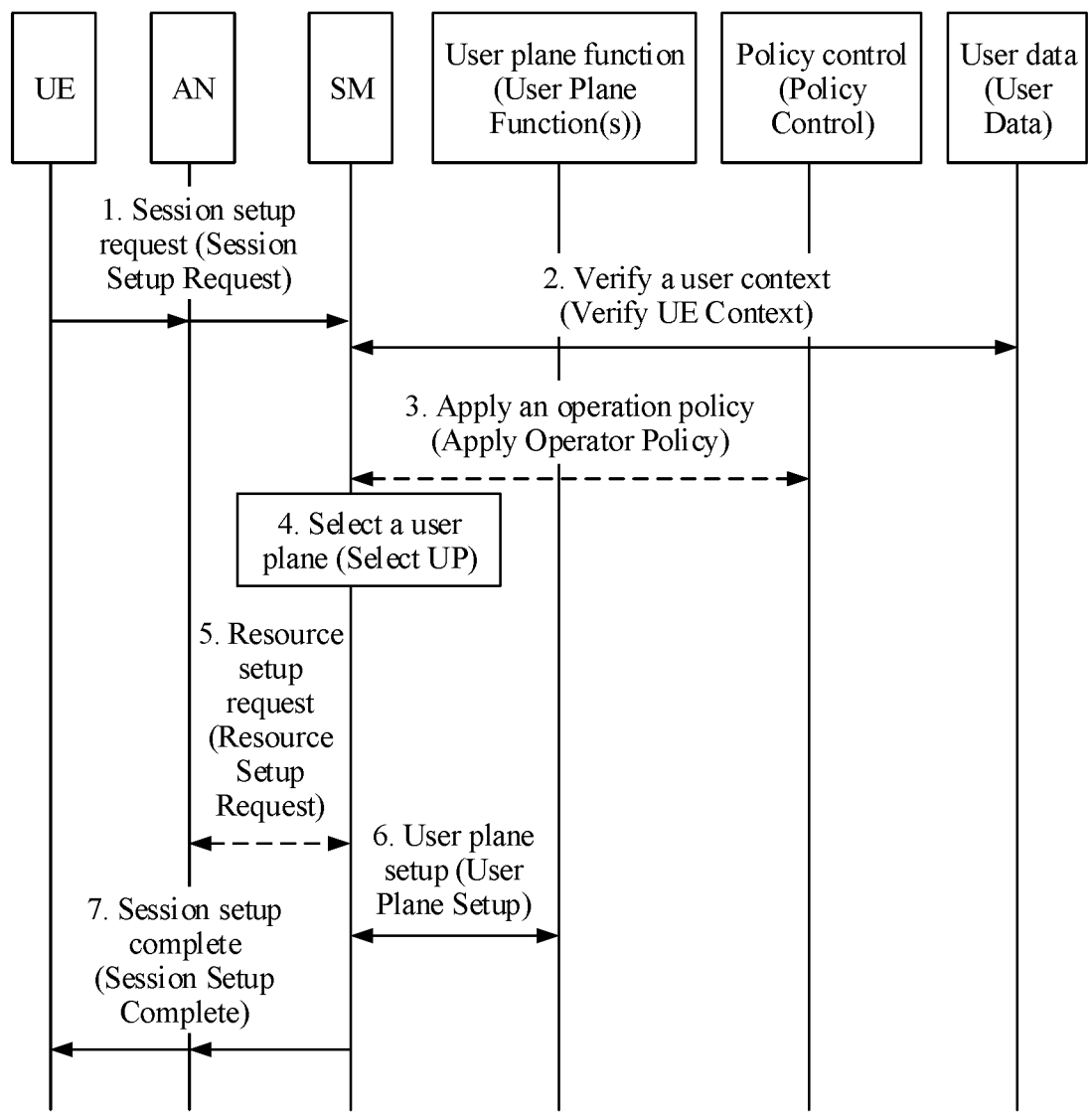
FIG. 2 is a schematic diagram of a session setup process based on a 5G network architecture that can be applied to embodiments of the present disclosure.

The technical solutions provided in the embodiments of this disclosure are applicable to a 5G network architecture. FIG. 1 is a schematic diagram of a 5G network architecture. The 5G network architecture in FIG. 1 includes network elements and interfaces used for communication between the network elements. The technical solutions provided in the embodiments of this disclosure are applicable to a session setup procedure based on the 5G network architecture. FIG. 2 is a schematic diagram of a session setup process provided based on a 5G network architecture. It should be noted that the technical solutions in all the embodiments of this disclosure are also applicable to a 5G-based slice network architecture. For each end-to-end slice, such as a service-based slice, a user plane security protection negotiation procedure of the service-based slice is implemented. Core procedures of the end-to-end slices are consistent, but an execution network element corresponds to a 5G slice structure. Particularly, an SMF may be deployed in a slice, and a UPF/an SPCF or the like is a network element in the slice.

For the 5G network architecture and the session setup process based on the 5G network architecture, embodiments of this disclosure provide a security protection negotiation method and a network element, to implement, based on the 5G network architecture, negotiation between user equipment (User Equipment, UE) and a user plane function (User Plane Function, UPF) to start user plane security protection for a current session. The security protection includes encryption and decryption protection and integrity protection. Encryption protection refers to a process of converting a plaintext into a ciphertext by using an encryption protection key and an encryption protection algorithm. Decryption protection is an inverse process of the encryption protection. The integrity protection refers to a process of generating a message authentication code (Message Authentication Code, MAC) by using an integrity protection key and an integrity protection algorithm. User plane security protection negotiation refers to a process in which the UE and the UPF that perform data security protection negotiate and synchronize security protection keys and security protection algorithms at respective security layers, and start user plane security protection. It should be noted that the embodiments of this disclosure further provide a method and a network element that can implement security protection negotiation, to implement, based on the 5G network architecture, negotiation between UE and a gNB to start user plane security protection for a current session. The gNB may be construed as a next generation NodeB (next generation Node Base station).

The method and the network element are based on a same inventive concept. Because a problem-resolving principle of the method is similar to that of the network element, mutual reference may be made to implementations of the method and the network element, and no repeated description is provided. The technical solutions provided in the embodiments of this disclosure may be performed after the session setup process, or may be performed in the session setup process.

Main network elements in the embodiments of this disclosure include UE, a session management function (Session Management Function, SMF), a UPF, and a security policy control function (Security Policy Control Function, SPCF).

The UE is a terminal device that can access a network. In one example, the UE may be an intelligent terminal device such as a mobile phone or a tablet computer. In another example, the UE may be a communications device such as a server, a gateway, a base station, or a controller. In still another example, the UE may be an Internet of Things device such as a sensor, an electricity meter, or a water meter.

The SMF is configured to control related signaling in a process of setting up, deleting, or modifying a session for the UE. The SMF in the embodiments of this disclosure may be located in a slice. In this case, there may be one or more SMFs in one slice. Alternatively, the SMF in the embodiments of this disclosure may be located outside a slice. In other words, the SMF is located between slices.

The UPF may also be referred to as a data plane gateway, for example, an egress gateway. User data reaches a data network (Data Network, DN) by using this network element. The UPF may be a service server or the like of the Internet or a third-party.

The SPCF is configured to obtain a security policy, negotiate a security policy, and decide a security policy. In some embodiments, the SPCF may select a security protection algorithm. For example, based on a security capability list of the UE and a network side security algorithm list that is obtained or stored in advance, the SPCF obtains an intersection set and sorts priorities to select a security algorithm to be finally used, which includes an encryption algorithm and an integrity protection algorithm.

The following describes the embodiments of this disclosure in detail with reference to the accompanying drawings. It should be noted that a presentation sequence of the embodiments of this disclosure represents only a sequence of the embodiments, and does not represent priorities of the technical solutions provided in the embodiments.

Embodiment 1

Figure 3:
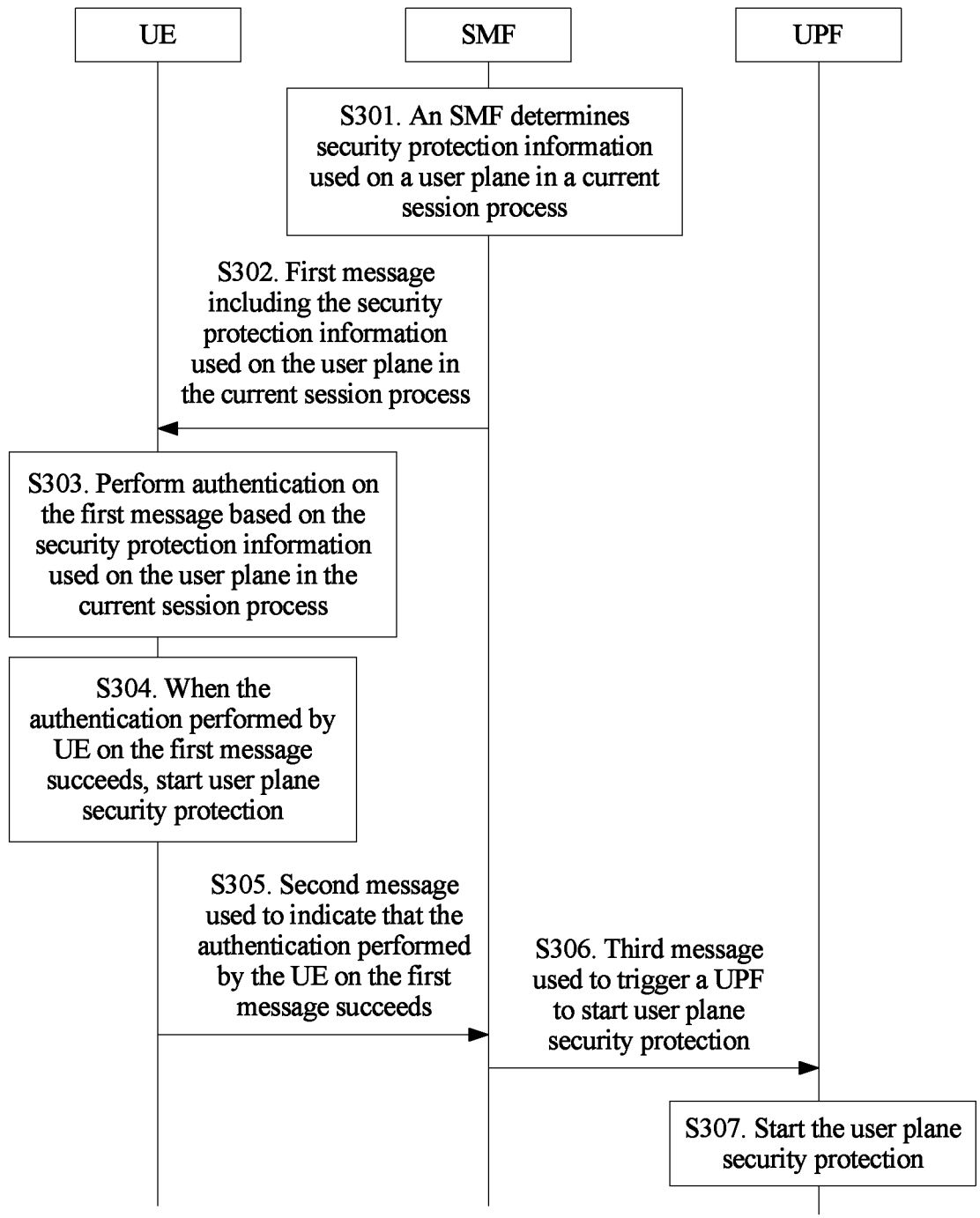
FIG. 3 is a schematic flowchart of a security protection negotiation method according to an embodiment of the present disclosure.

As shown in FIG. 3, this embodiment of this disclosure provides a security protection negotiation method. A procedure of interaction between network elements is as follows:

S301. An SMF determines security protection information used on a user plane in a current session process.

The security protection information in S301 includes but is not limited to a security protection algorithm, an index used to identify a security protection context, and a message authentication code. Security protection includes encryption and decryption protection and integrity protection. The message authentication code is an authentication code obtained after the SMF performs calculation on the first message by using an integrity protection algorithm and an integrity protection key. Because the security protection context includes an encryption and decryption protection context and an integrity protection context, the encryption and decryption protection context includes an encryption and decryption protection key, and the integrity protection context includes the integrity protection key, the integrity protection key can be identified by using the index used to identify the security protection context.

It should be understood from the foregoing description that the security protection information that is determined by the SMF in S301 and that is used on the user plane in the current session process (the terms "current session process" and "current session" are interchangeably used herein) includes the following information: an encryption and decryption protection algorithm used on the user plane in the current session process, the integrity protection algorithm used on the user plane in the current session process, an index used to identify the encryption and decryption protection context used on the user plane in the current session process, an index used to identify the integrity protection context used on the user plane in the current session process, and the message authentication code. The index used to identify the encryption and decryption protection context used on the user plane in the current session process and the index used to identify the integrity protection context used on the user plane in the current session process may be a same index, or may be different indexes. For example, an identifier of a current session/a slice identifier may be used as the index used to identify the encryption and decryption protection context used on the user plane in the current session process and the index used to identify the integrity protection context used on the user plane in the current session process.

The security protection information in S301 may further include a security capability of UE, and the security capability of the UE is used by the UE to perform security capability authentication.

In this embodiment, in S301, the SMF may determine, in the following two modes, the security protection algorithm used on the user plane in the current session process. The security protection algorithm includes the encryption and decryption protection algorithm and the integrity protection algorithm.

In mode 1, the SMF obtains, from an SPCF, the security protection algorithm that is determined by the SPCF through negotiation and that is used on the user plane in the current session process.

In mode 1, the SPCF stores all original security protection algorithms of the user plane, the SPCF autonomously determines, through negotiation based on the original security protection algorithms of the user plane, the security protection algorithm used on the user plane in the current session process, and the SMF obtains, from the SPCF, the security protection algorithm that is determined by the SPCF through negotiation and that is used on the user plane in the current session process.

In mode 2, the SMF autonomously determines, through negotiation, the security protection algorithm used on the user plane in the current session process.

In mode 2, an SPCF stores all original security protection algorithms of the user plane, and the SMF obtains the original security protection algorithms of the user plane from the SPCF, and autonomously determines, through negotiation based on the obtained original security protection algorithms of the user plane, the security protection algorithm used on the user plane in the current session process.

Alternatively, in mode 2, the SMF has obtained a security protection algorithm/security capability supported by UE and a security protection algorithm/security capability supported by a network, an SPCF obtains a security protection algorithm/security capability supported by a service to which the current session belongs, and returns the security protection algorithm/security capability to the SMF, and then the SMF autonomously determines, through negotiation based on all the foregoing security algorithms, the security protection algorithm used on the user plane in the current session process.

In mode 1 and mode 2, when the SPCF is deployed on a network, the SPCF may be independently deployed, or may be deployed on any one of a security anchor function (Security Anchor Function, SEAF), an authentication server function (Authentication Server Function, AUSF), and the SMF. Both the SEAF and the AUSF are network elements having a security authentication function.

If the SPCF is deployed on the SEAF or the AUSF, mode 1 may be construed as a mode in which the SMF obtains, from the SEAF or the AUSF, the security protection algorithm used on the user plane in the current session process, and mode 2 may be construed as a mode in which the SMF obtains the original security protection algorithms of the user plane from the SEAF or the AUSF, or mode 2 may be construed as a mode in which the SMF obtains, from the SEAF or the AUSF, the security protection algorithm/security capability supported by the service to which the current session belongs. If the SPCF is deployed on the SMF, the mode 1 may be construed as a mode in which the SMF autonomously determines, through negotiation, the security protection algorithm used on the user plane in the current session process, and the mode 2 may be construed as a mode in which the SMF stores all the original security protection algorithms of the user plane, or the mode 2 may be construed as a mode in which the SMF has obtained the security protection algorithm/security capability supported by the service to which the current session belongs.

Regardless of the mode 1 or the mode 2, methods for determining, through negotiation, the security protection algorithm used on the user plane in the current session process are the same. To be specific, the security protection algorithm used on the user plane in the current session process is determined through negotiation based on the security protection algorithm/security capability supported by UE, the security protection algorithm/security capability supported by the network, and the security protection algorithm/security capability supported by the service to which the current session belongs. For example, the security protection algorithm supported by the UE, the security protection algorithm supported by the network, and the security protection algorithm supported by the service to which the current session belongs are determined, and the algorithm with the highest priority is selected from the determined algorithms as the security protection algorithm used on the user plane in the current session process.

In this embodiment, the SMF may initiate a user plane security protection negotiation process after obtaining or deriving a user plane root key Kup, or may initiate a user plane security protection negotiation process after generating and distributing a user plane encryption and decryption key and a user plane integrity protection key. The user plane security protection negotiation process refers to execution of the security protection negotiation method provided in this embodiment. It should be noted that for a method used by the SMF to obtain or derive the user plane root key Kup, and a method used by the SMF to generate and distribute the user plane encryption and decryption key and the user plane integrity protection key based on the user plane root key Kup, refer to the prior art. Details are not described herein.

S302. The SMF sends to UE a first message including the security protection information used on the user plane in the current session process.

The first message in S302 may be a user plane security mode request (Security Mode Command) message.

When the security protection negotiation method provided in this embodiment is performed after a process of setting up the current session, the SMF sets up the current session before S301.

When the security protection negotiation method provided in this embodiment is performed in a process of setting up the current session, before S301, the UE sends, to the SMF, a session setup request message used to request to set up the current session. After receiving the session setup request message, the SMF needs to determine a network element that serves as a termination point of the user plane. The termination point of the user plane is a network element that needs to start user plane security protection other than the UE. In the method shown in FIG. 3, the termination point that is determined by the SMF and that is of the user plane is a UPF. After determining that the termination point of the user plane is the UPF, the SMF sends a notification message to a radio access network (Radio Access Network, RAN). The notification message is used to instruct the SMF to perform a user plane security protection negotiation method between the UE and the UPF. Then, the SMF performs S301. When performing S302, the SMF sends a session setup response message to the UE, to send, to the UE, the security protection information used on the user plane in the current session process.

It should be noted that in the foregoing process, the termination point that is of the user plane and that is determined by the SMF after the SMF receives the session setup request message sent by the UE may alternatively be a gNB. In this scenario, a method for implementing user plane security protection negotiation between the UE and the gNB is described in the following embodiment.

S303. The UE performs authentication on the first message based on the security protection information used on the user plane in the current session process.

A method for performing authentication on the first message by the UE in S303 includes: The UE needs to perform calculation on the first message based on the integrity protection algorithm and an integrity protection key that is derived by the UE, to obtain a message authentication code, and the UE compares the message authentication code obtained through calculation performed by the UE with the received message authentication code sent by the SMF. When the two message authentication codes are the same, it indicates that the first message is not tampered with, and integrity protection authentication performed by the UE on the first message succeeds. When the two message authentication codes are different, the UE determines that integrity protection authentication on the first message fails.

When the security protection information sent by the SMF to the UE further includes the security capability of the UE, the UE further needs to perform security capability authentication before performing integrity protection authentication on the first message. In some embodiments, the UE compares the security capability of the UE that is included in the security protection information with a security capability stored in the UE, and the security capability authentication is considered to be successful when the two security capabilities are the same, or the security capability authentication is considered as a failure or fails when the two security capabilities are different. The security capability authentication performed by the UE can prevent a bidding-down attack.

If both the integrity protection authentication and the security capability authentication are successful, it is considered that the authentication performed by the UE on the first message is successful. When there is a failure in either the integrity protection authentication and the security capability authentication, it is considered that the authentication performed by the UE on the first message fails.

S304. When the authentication performed by the UE on the first message is successful, the UE starts user plane security protection.

The user plane security protection started by the UE includes user plane encryption and decryption protection and integrity protection started by the UE for the current session process, and the encryption and decryption protection includes uplink encryption protection and downlink decryption protection.

S305. When the authentication performed by the UE on the first message is successful, the UE sends, to the SMF, a second message indicating that the authentication performed by the UE on the first message has been successful.

The second message in S305 may be a user plane security mode complete (Security Mode Complete) message. The second message may carry a message authentication code. The message authentication code is an authentication code obtained after the UE performs calculation on the second message based on the integrity protection key and the integrity protection algorithm that are used on the user plane in the current session process. The second message is encrypted and signed by using an uplink encryption protection key and an uplink encryption protection algorithm that are used on the user plane in the current session process.

It should be noted that a sequence of S304 and S305 is not limited in this embodiment.

For example, S304 and S305 may be performed as follows: When the authentication performed by the UE on the first message succeeds, the UE starts the user plane encryption and decryption protection and integrity protection, and then sends, to the SMF, the second message used to indicate that the authentication performed by the UE on the first message succeeds, where the encryption and decryption protection includes the uplink encryption protection and the downlink decryption protection. For another example, S304 and S305 may be performed as follows: The UE starts user plane downlink decryption protection and integrity protection, and then sends, to the SMF, the second message used to indicate that the authentication performed by the UE on the first message succeeds, and the UE starts user plane uplink encryption protection after sending the second message. For still another example, S304 and S305 may be performed as follows: When the authentication performed by the UE on the first message succeeds, the UE first sends, to the SMF, the second message used to indicate that the authentication performed by the UE on the first message succeeds, and then starts the user plane encryption and decryption protection and integrity protection.

In this embodiment, after the UE performs authentication on the first message based on the security protection information used on the user plane in the current session process in S303, when the authentication performed by the UE on the first message fails, the UE determines not to start the user plane security protection, and sends, to the SMF, a fourth message used to indicate that the authentication performed by the UE on the first message fails. In other words, when the authentication performed by the UE on the first message fails, a procedure of the security protection negotiation method shown in FIG. 3 ends.

S306. The SMF sends, to a UPF, a third message including a security protection algorithm and a security protection context that are used on the user plane in the current session process, where the third message is used to trigger the UPF to start user plane security protection based on the security protection algorithm and the security protection context that are used on the user plane in the current session process.

The security protection context includes the encryption and decryption protection key and the integrity protection key.

S307. The UPF starts user plane security protection according to an instruction of the third message.

In this embodiment, the user plane security protection started by the UPF includes user plane encryption and decryption protection and integrity protection started by the UPF for the current session process, and the encryption and decryption protection includes downlink encryption protection and uplink decryption protection.

In S306, the SMF may trigger, by using a message, the UPF to start the user plane security protection. In this case, in S307, the UPF may start the user plane security protection on a same occasion based on the message sent by the SMF. For example, in S306, after the SMF determines that the UE starts the user plane security protection, the SMF sends, to the UPF, the third message including the security protection algorithm and the security protection context that are used on the user plane in the current session process. In S307, the UPF starts the downlink encryption protection, the integrity protection, and the uplink decryption protection according to the instruction of the third message.

Alternatively, in S306, the SMF may trigger, by using a plurality of messages, the UPF to start the user plane security protection. The plurality of messages may be sent on different occasions. In this case, in S307, the UPF may start the user plane security protection on different occasions based on the plurality of messages sent by the SMF. For example, in S306, after the SMF sends, to the UE, the security protection information used on the user plane in the current session process, the SMF sends, to the UPF, a first trigger message including a security protection algorithm and a security protection context that are used on the user plane in the current session process, where the first trigger message is used to trigger the UPF to start user plane downlink encryption protection and integrity protection. After the SMF determines that the UE starts the user plane security protection, the SMF sends, to the UPF, a second trigger message including a security protection algorithm and a security protection context that are used on the user plane in the current session process, where the second trigger message is used to trigger the UPF to start user plane uplink decryption protection. In S307, the UPF starts the downlink encryption protection and the integrity protection according to an instruction of the first trigger message, and starts the uplink decryption protection according to an instruction of the second trigger message. The first trigger message may include only a downlink encryption algorithm and key and an integrity protection algorithm and key that are used on the user plane in the current session process, and the second trigger message may include only an uplink decryption algorithm and key that are used on the user plane in the current session process.

According to the security protection negotiation method shown in FIG. 3, the UE and the UPF can negotiate to start respective user plane security protection. Because a user plane connection in a 5G network architecture is set up based on a session, and according to the method shown in FIG. 3, the UE and the UPF can negotiate to start respective session granularity-based user plane security protection, the method shown in FIG. 3 can meet a requirement of the 5G network architecture for user plane security protection.

Based on the security protection negotiation method shown in FIG. 3, the method is appropriately extended and modified in the embodiments. The following describes the method by using examples.

Example 1

Figure 4:
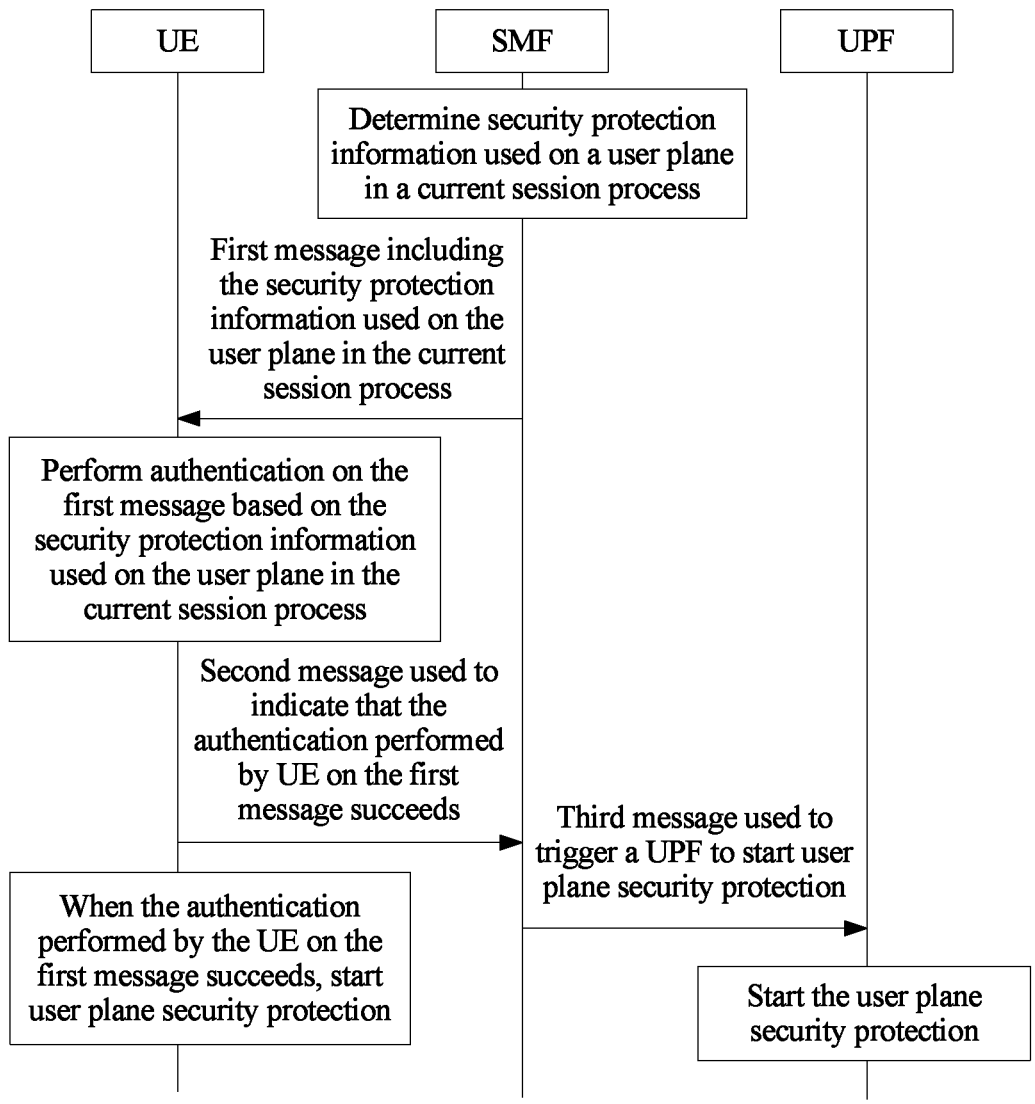
FIG. 4 to FIG. 21 are schematic flowcharts of security protection negotiation methods provided in Example 1 to Example 18 according to an embodiment of the present disclosure.

FIG. 4 is a schematic flowchart of a security protection negotiation method according to an embodiment. A main difference from the method shown in FIG. 3 is that in the method shown in FIG. 4, the UE starts the user plane security protection at a time different from that in FIG. 3. In the method shown in FIG. 4, after the UE successfully authenticates a first message, the UE first sends, to an SMF, a second message, namely, a security mode complete message, to indicate that the authentication performed by the UE on the first message is successful, and then the UE starts the user plane security protection. For other steps of the method shown in FIG. 4, refer to the method shown in FIG. 3. Details are not described herein again.

Example 2

Figure 5:
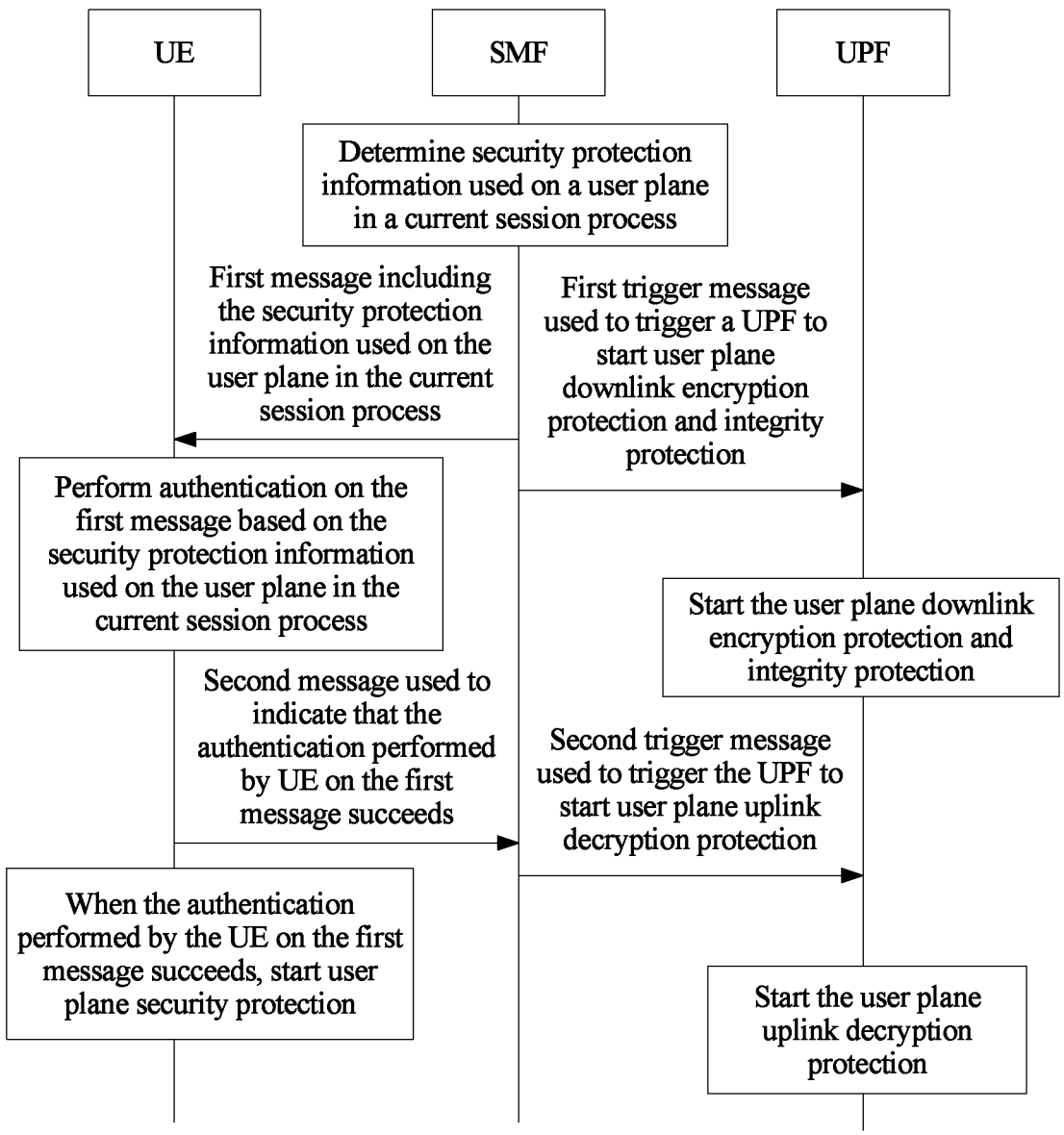

FIG. 5 is a schematic flowchart of a security protection negotiation method according to an embodiment. A main difference from the method shown in FIG. 3 is that in the method shown in FIG. 5, a UPF starts user plane security protection at a time different from that in FIG. 3. In the method shown in FIG. 5, an SMF triggers, on different times, the UPF to start the user plane security protection. Details are as follows: After sending, to UE, security protection information used on a user plane in a current session process, the SMF sends, to the UPF, a first trigger message including a security protection algorithm and a security protection context that are used on the user plane in the current session process. The first trigger message is used to trigger the UPF to start user plane downlink encryption protection and integrity protection. The UPF starts the user plane downlink encryption protection and integrity protection after receiving the first trigger message. After determining that authentication performed by the UE on a first message succeeds, the SMF sends, to the UPF, a second trigger message including a security protection algorithm and a security protection context that are used on the user plane in the current session process. The second trigger message is used to trigger the UPF to start user plane uplink decryption protection. The UPF starts the user plane uplink decryption protection after receiving the second trigger message. For other steps of the method shown in FIG. 5, refer to the method shown in FIG. 3. Details are not described herein again.

Example 3

Figure 6:
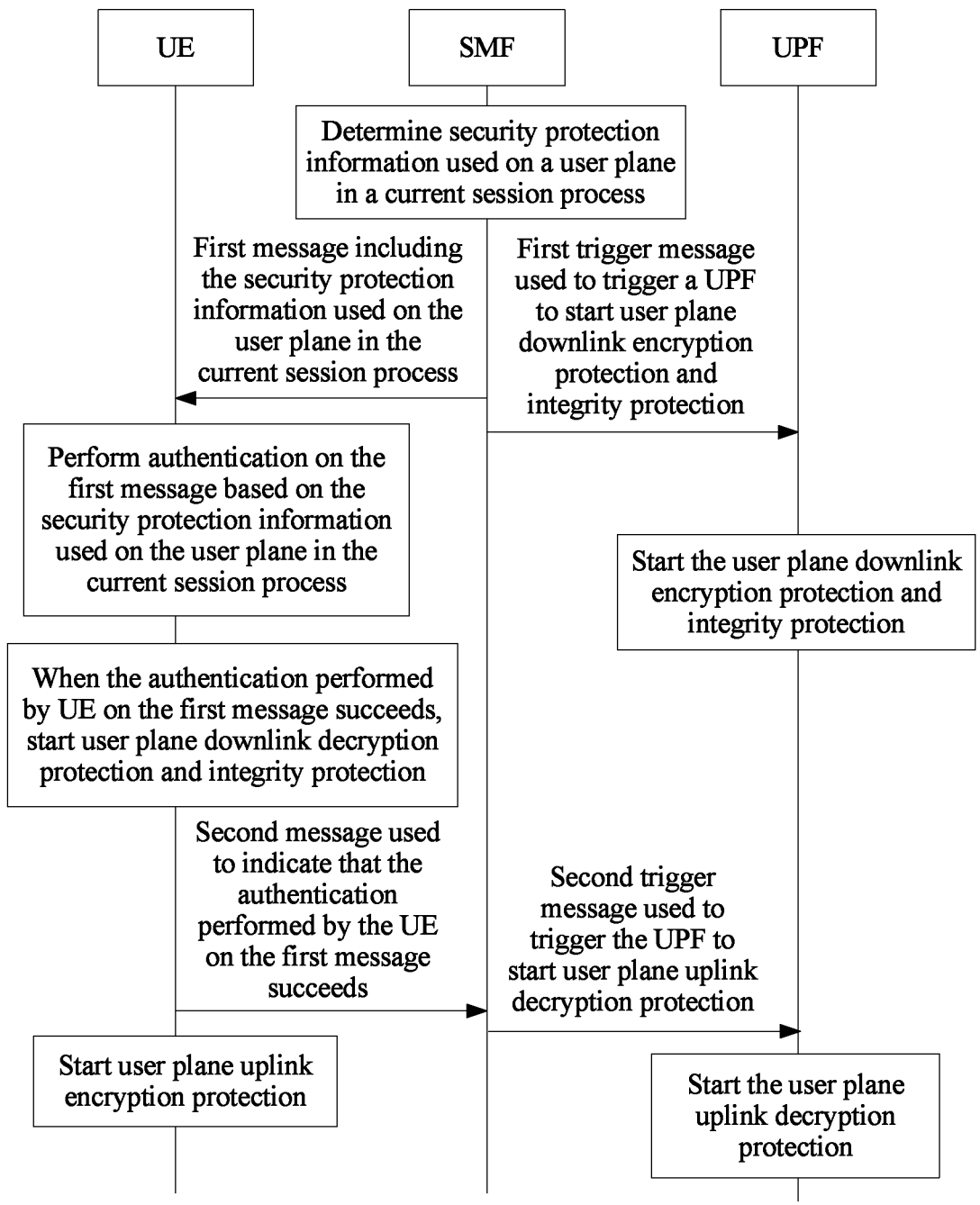

FIG. 6 is a schematic flowchart of a security protection negotiation method according to an embodiment. A main difference from the method shown in FIG. 3 is that in the method shown in FIG. 6, both UE and a UPF start user plane security protection on occasions different from those in FIG. 3. In the method shown in FIG. 6, after authentication performed by the UE on a first message succeeds, the UE starts user plane downlink decryption protection and integrity protection, and then sends, to an SMF, a second message, namely, a security mode complete message, that is used to indicate that the authentication performed by the UE on the first message succeeds. The UE starts user plane uplink encryption protection after sending the second message. For a method for starting user plane security protection by the UPF, refer to the method shown in FIG. 5. For other steps of the method shown in FIG. 6, refer to the method shown in FIG. 3. Details are not described herein again.

Example 4

Figure 7A:
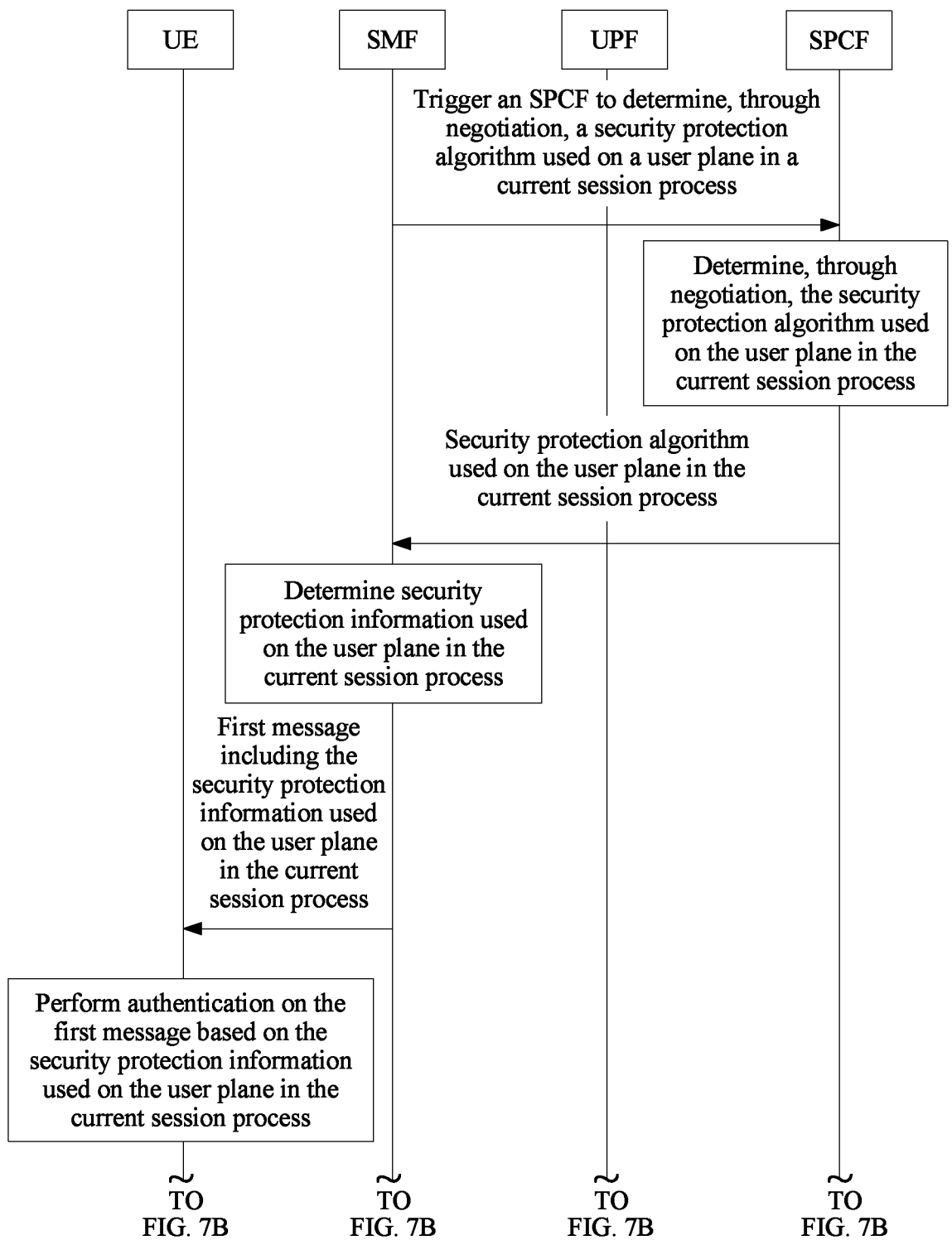
Figure 7B:
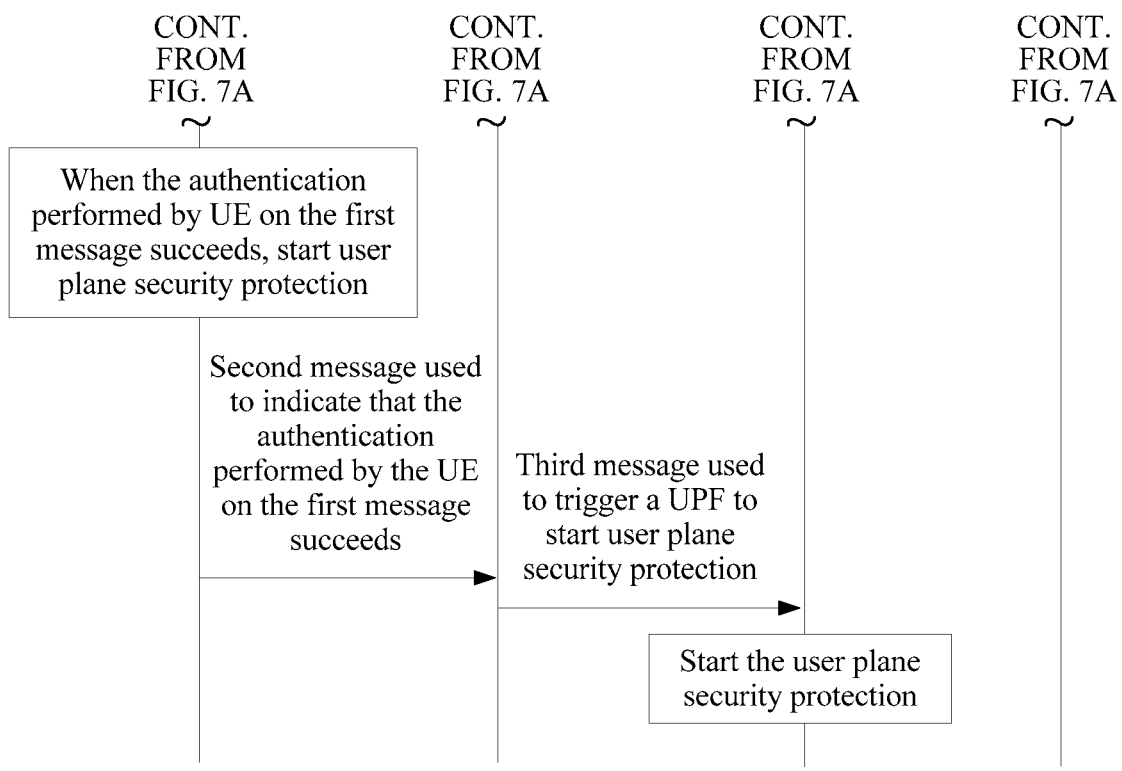

FIG. 7A and FIG. 7B are a schematic flowchart of a security protection negotiation method according to an embodiment. A main difference from the method shown in FIG. 3 is that in the method shown in FIG. 7A and FIG. 7B, a process in which an SPCF determines, through negotiation, a security protection algorithm used on a user plane in a current session process is added.

In the method shown in FIG. 7A and FIG. 7B, an SMF first triggers the SPCF to determine, through negotiation, the security protection algorithm used on the user plane in the current session process. The security protection algorithm includes an encryption and decryption protection algorithm and an integrity protection algorithm that are used on the user plane in the current session process. The SPCF determines, through negotiation based on a security protection algorithm/security capability supported by UE, a security protection algorithm/security capability supported by a network, and a security protection algorithm/security capability supported by a service to which a current session belongs, the security protection algorithm used on the user plane in the current session process. The SPCF sends, to the SMF, the security protection algorithm that is determined through negotiation and that is used on the user plane in the current session process. In the method shown in FIG. 7A and FIG. 7B, the method shown in FIG. 3 is performed after the foregoing process. It should be understood that a process in which the SMF obtains, from the SPCF, the security protection algorithm used on the user plane in the current session process should be a part of a process in which the SMF determines security protection information used on the user plane in the current session process. For other steps of the method shown in FIG. 7A and FIG. 7B, refer to the method shown in FIG. 3. Details are not described herein again.

It should be noted that the method shown in FIG. 7A and FIG. 7B may be appropriately extended and modified in this embodiment. For example, after the SMF receives the security protection algorithm that is sent by the SPCF and that is used on the user plane in the current session process, the SMF triggers a UPF to start user plane security protection.

Example 5

Figure 8A:
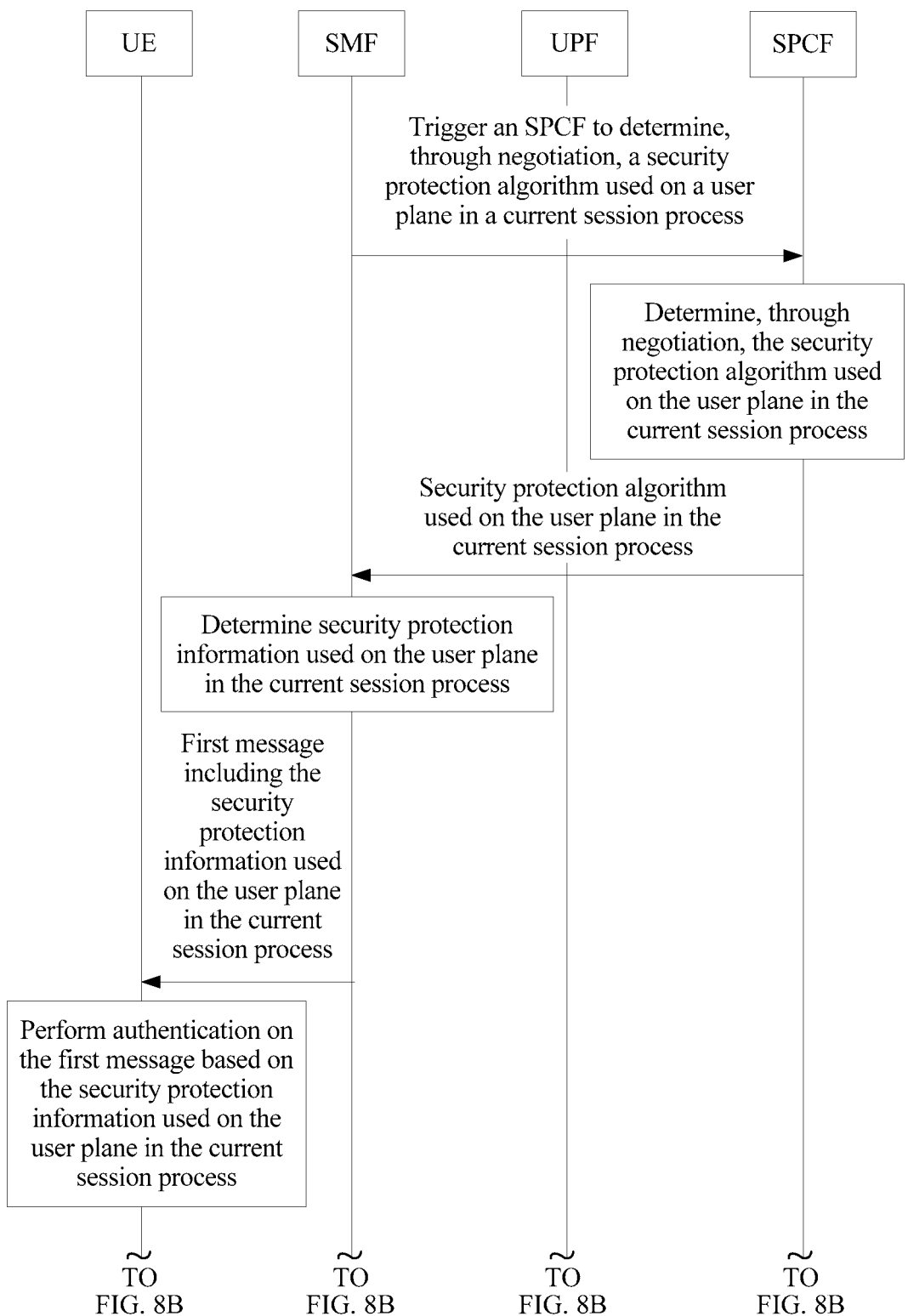
Figure 8B:
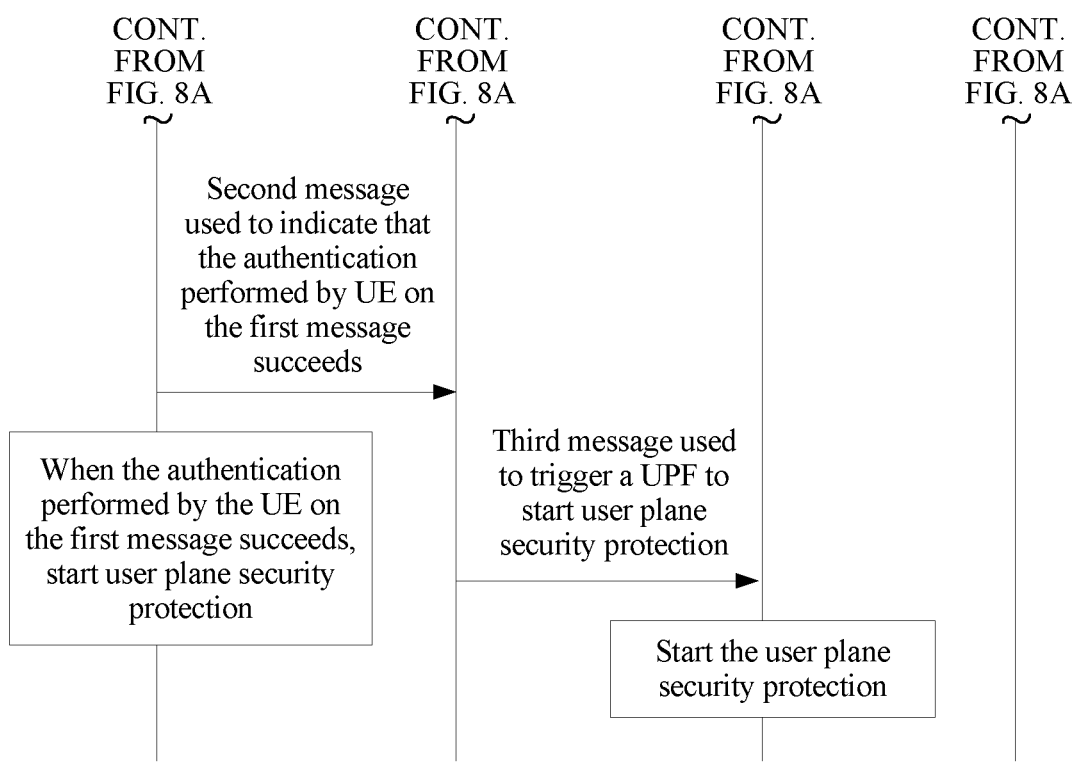

FIG. 8A and FIG. 8B are a schematic flowchart of a security protection negotiation method according to an embodiment. A main difference from the method shown in FIG. 3 is that in the method shown in FIG. 8A and FIG. 8B, a process in which an SPCF determines, through negotiation, a security protection algorithm used on a user plane in a current session process is added, and UE starts user plane security protection on an occasion different from that in FIG. 3. For the process that is added to the method shown in FIG. 8A and FIG. 8B and in which the SPCF determines, through negotiation, the security protection algorithm used on the user plane in the current session process, refer to a corresponding part in the method shown in FIG. 7A and FIG. 7B. For the occasion on which the UE starts the user plane security protection in the method shown in FIG. 8A and FIG. 8B, refer to a corresponding part in the method shown in FIG. 4. For other steps of the method shown in FIG. 8A and FIG. 8B, refer to the method shown in FIG. 3. Details are not described herein again.

Example 6

Figure 9A:
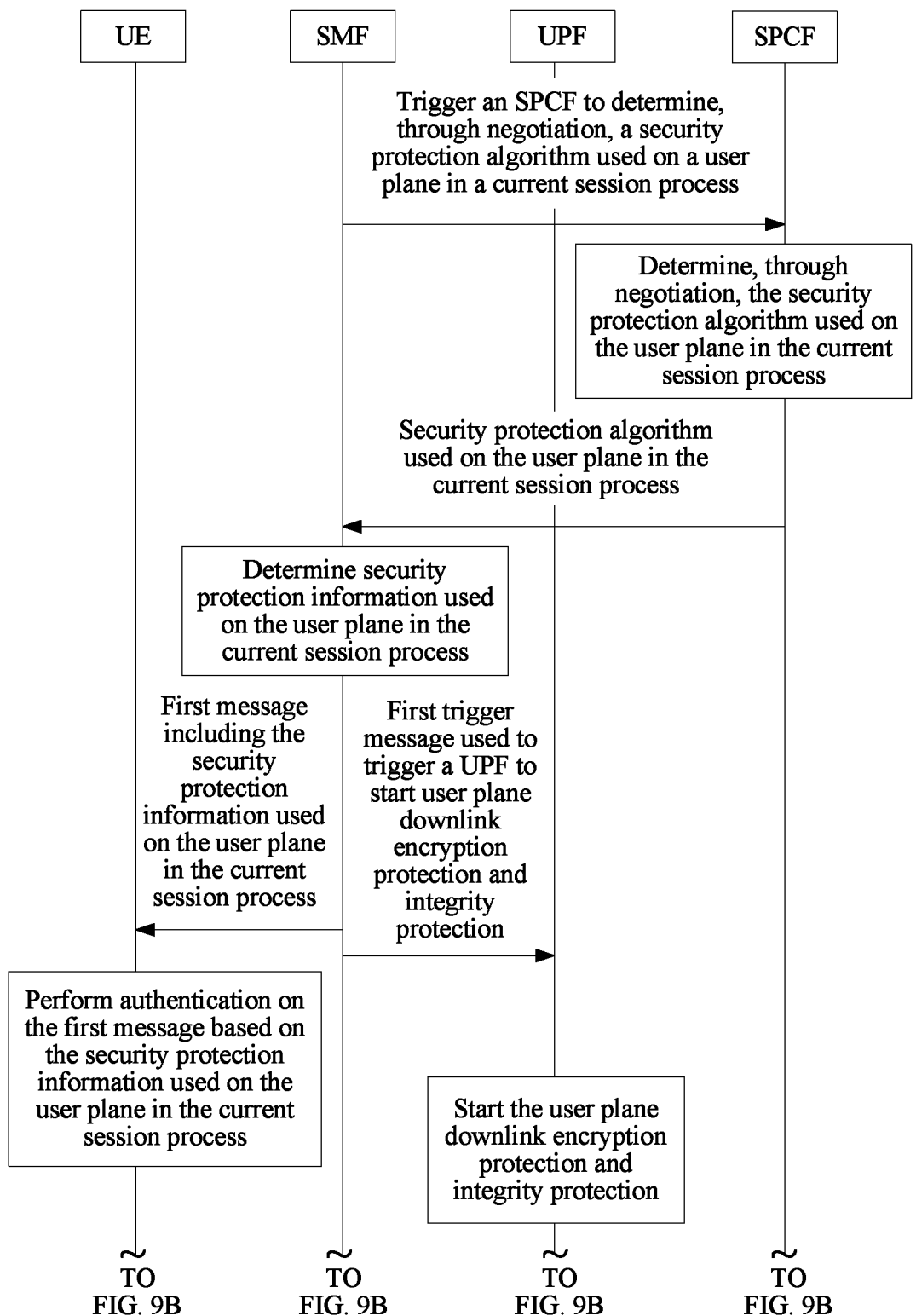
Figure 9B:
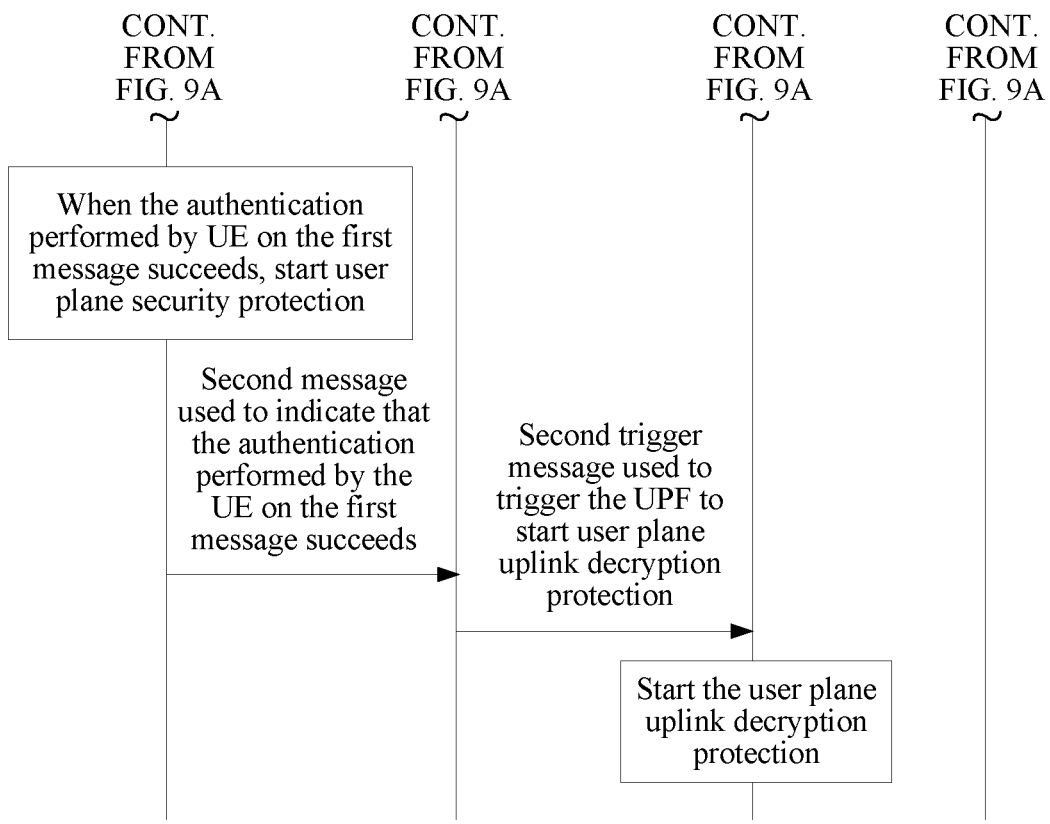

FIG. 9A and FIG. 9B are a schematic flowchart of a security protection negotiation method according to an embodiment. A main difference from the method shown in FIG. 3 is that in the method shown in FIG. 9A and FIG. 9B, a process in which an SPCF determines, through negotiation, a security protection algorithm used on a user plane in a current session process is added, and a UPF starts user plane security protection on an occasion different from that in FIG. 3. For the process that is added to the method shown in FIG. 9A and FIG. 9B and in which the SPCF determines, through negotiation, the security protection algorithm used on the user plane in the current session process, refer to a corresponding part in the method shown in FIG. 7A and FIG. 7B. For the occasion on which the UPF starts the user plane security protection in the method shown in FIG. 9A and FIG. 9B, refer to a corresponding part in the method shown in FIG. 5. For other steps of the method shown in FIG. 9A and FIG. 9B, refer to the method shown in FIG. 3. Details are not described herein again.

Example 7

Figure 10A:
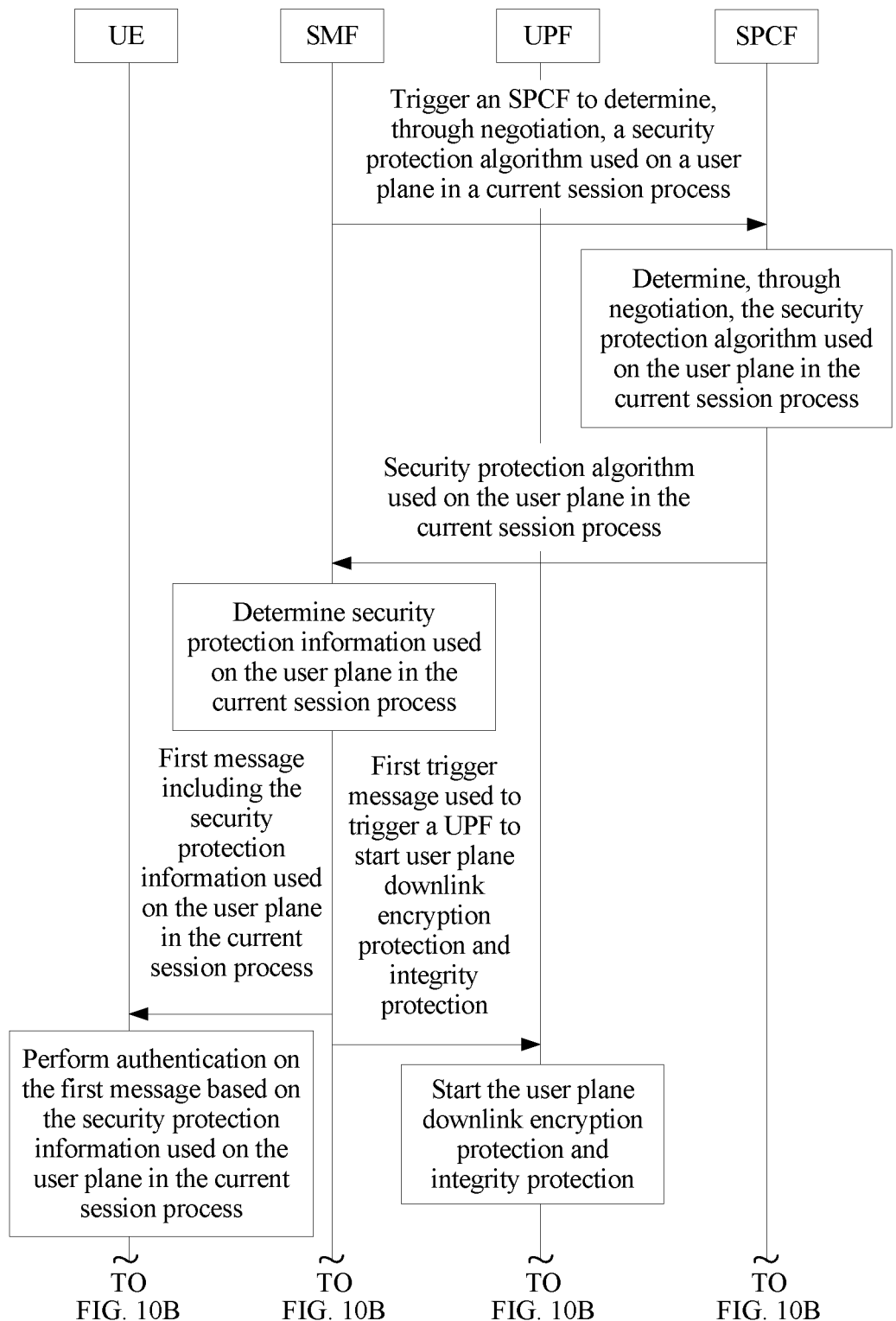
Figure 10B:
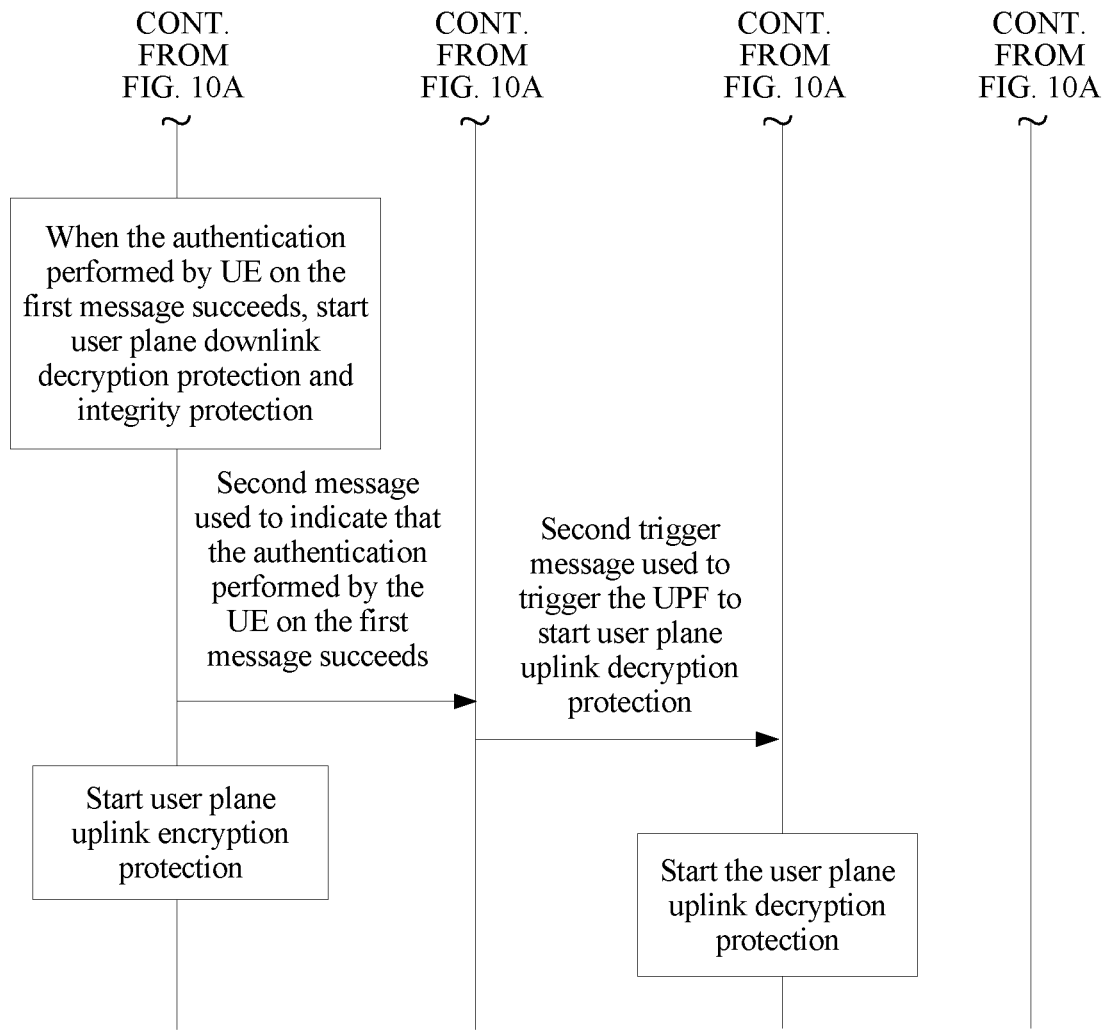

FIG. 10A and FIG. 10B are a schematic flowchart of a security protection negotiation method according to an embodiment. A main difference from the method shown in FIG. 3 is that in the method shown in FIG. 10A and FIG. 10B, a process in which an SPCF determines, through negotiation, a security protection algorithm used on a user plane in a current session process is added, and both UE and a UPF start user plane security protection on occasions different from those in FIG. 3. For the process that is added to the method shown in FIG. 10A and FIG. 10B and in which the SPCF determines, through negotiation, the security protection algorithm used on the user plane in the current session process, refer to a corresponding part in the method shown in FIG. 7A and FIG. 7B. For an occasion on which the UE starts the user plane security protection in the method shown in FIG. 10A and FIG. 10B, refer to a corresponding part in the method shown in FIG. 4. For an occasion on which the UPF starts the user plane security protection in the method shown in FIG. 10A and FIG. 10B, refer to a corresponding part in the method shown in FIG. 5. For other steps of the method shown in FIG. 10A and FIG. 10B, refer to the method shown in FIG. 3. Details are not described herein again.

Example 8

Figure 11A:
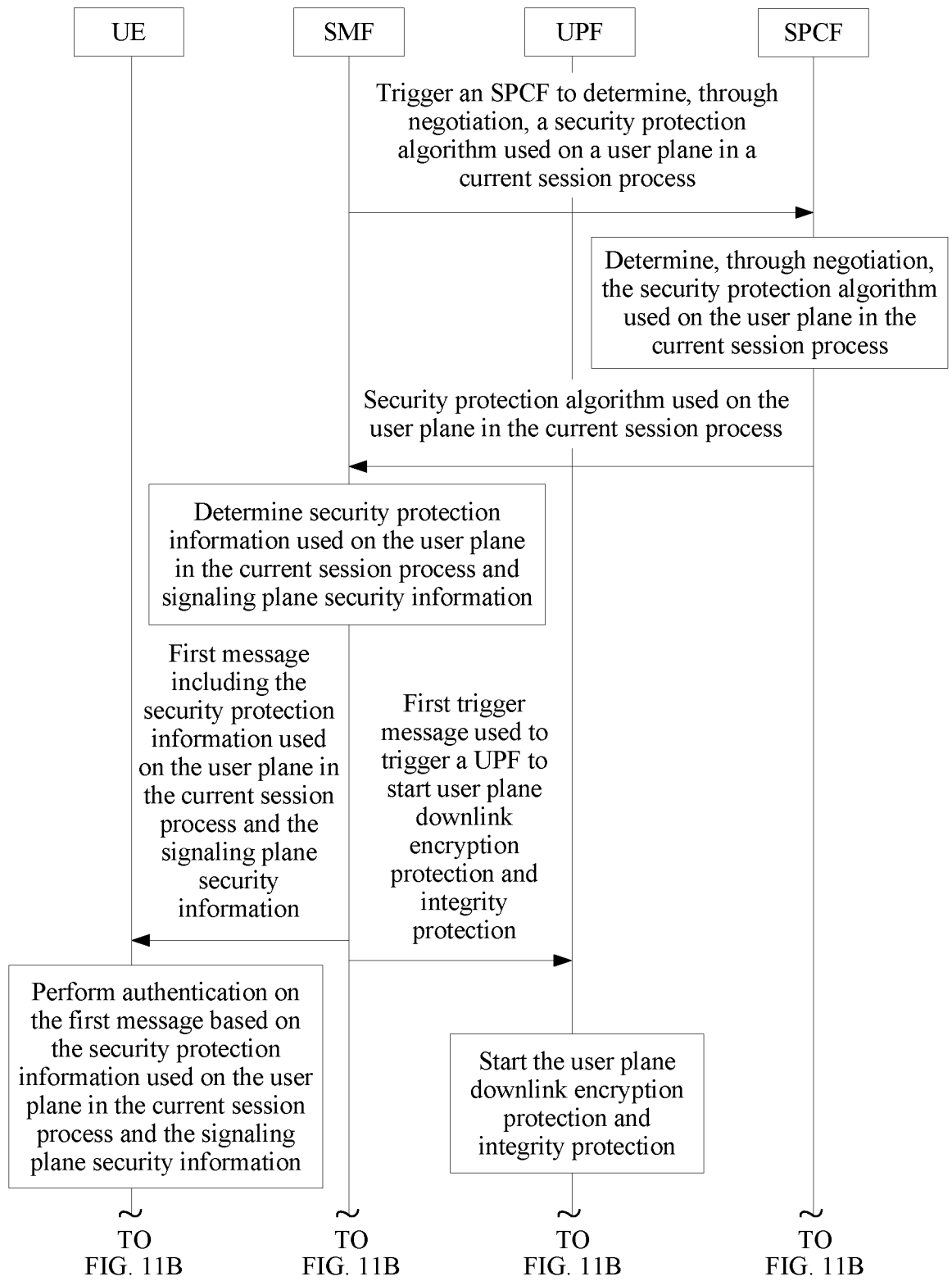
Figure 11B:
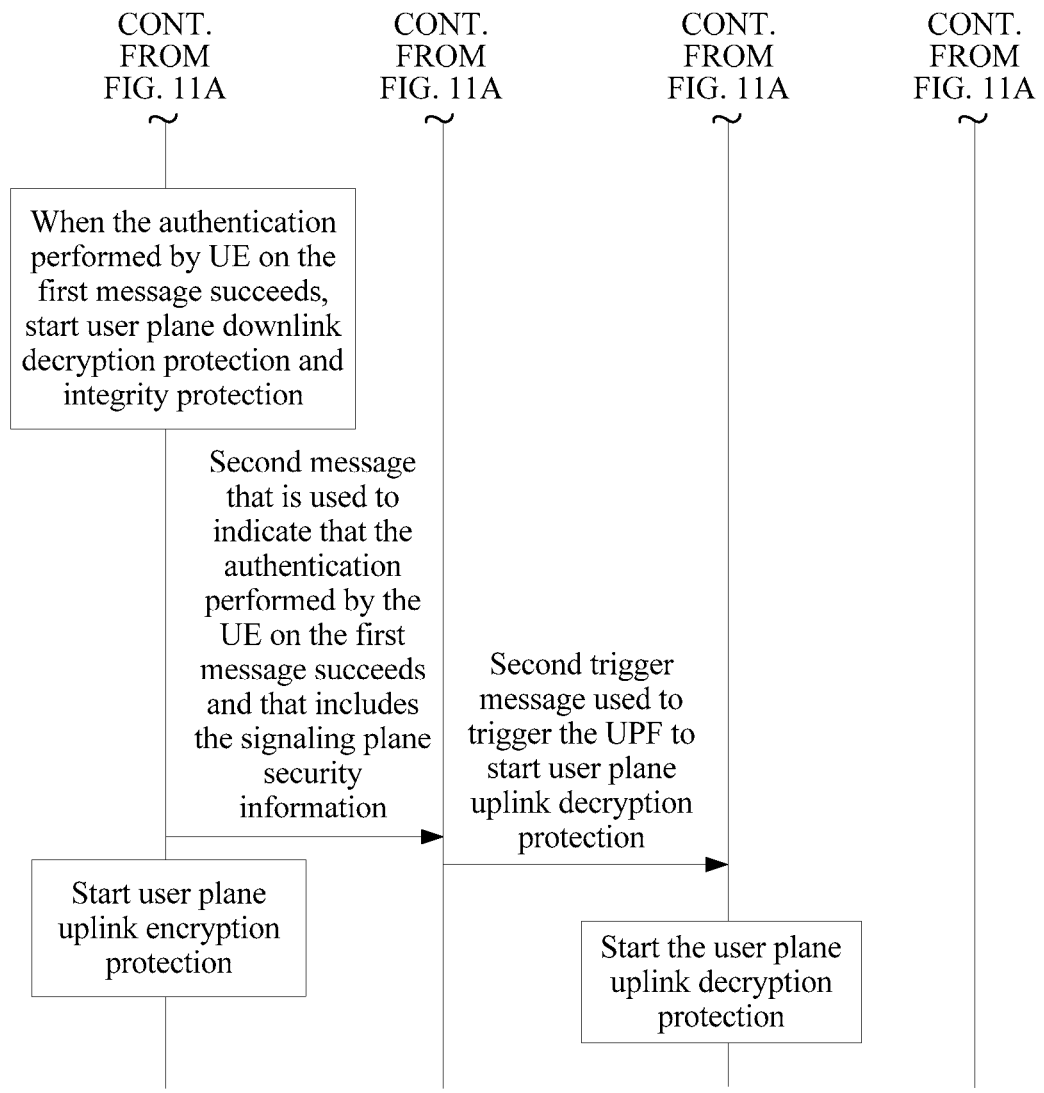

FIG. 11A and FIG. 11B are a schematic flowchart of a security protection negotiation method according to an embodiment. A main difference from the method shown in FIG. 10A and FIG. 10B is that in the method shown in FIG. 11A and FIG. 11B, a user plane security protection negotiation method is combined with a signaling plane security protection negotiation method.

In the method shown in FIG. 11A and FIG. 11B, in addition to the user plane security protection negotiation method, in the signaling plane security protection negotiation method, an SMF determines security protection information used on a signaling plane in a current session, for example, a key and an algorithm. The SMF sends, to UE by using a first message, the security protection information used on the signaling plane in a current session process. The UE performs authentication on the first message based on the security protection information used on the signaling plane in the current session process, and when the authentication succeeds, the UE sends, to the SMF by using a second message, the security protection information used on the signaling plane in the current session process. It should be noted that for the signaling plane security protection negotiation method, refer to the prior art, and for the user plane security protection negotiation method in the method shown in FIG. 11A and FIG. 11B, refer to the method shown in FIG. 10A and FIG. 10B. Details are not described herein again.

Example 9

Figure 12A:
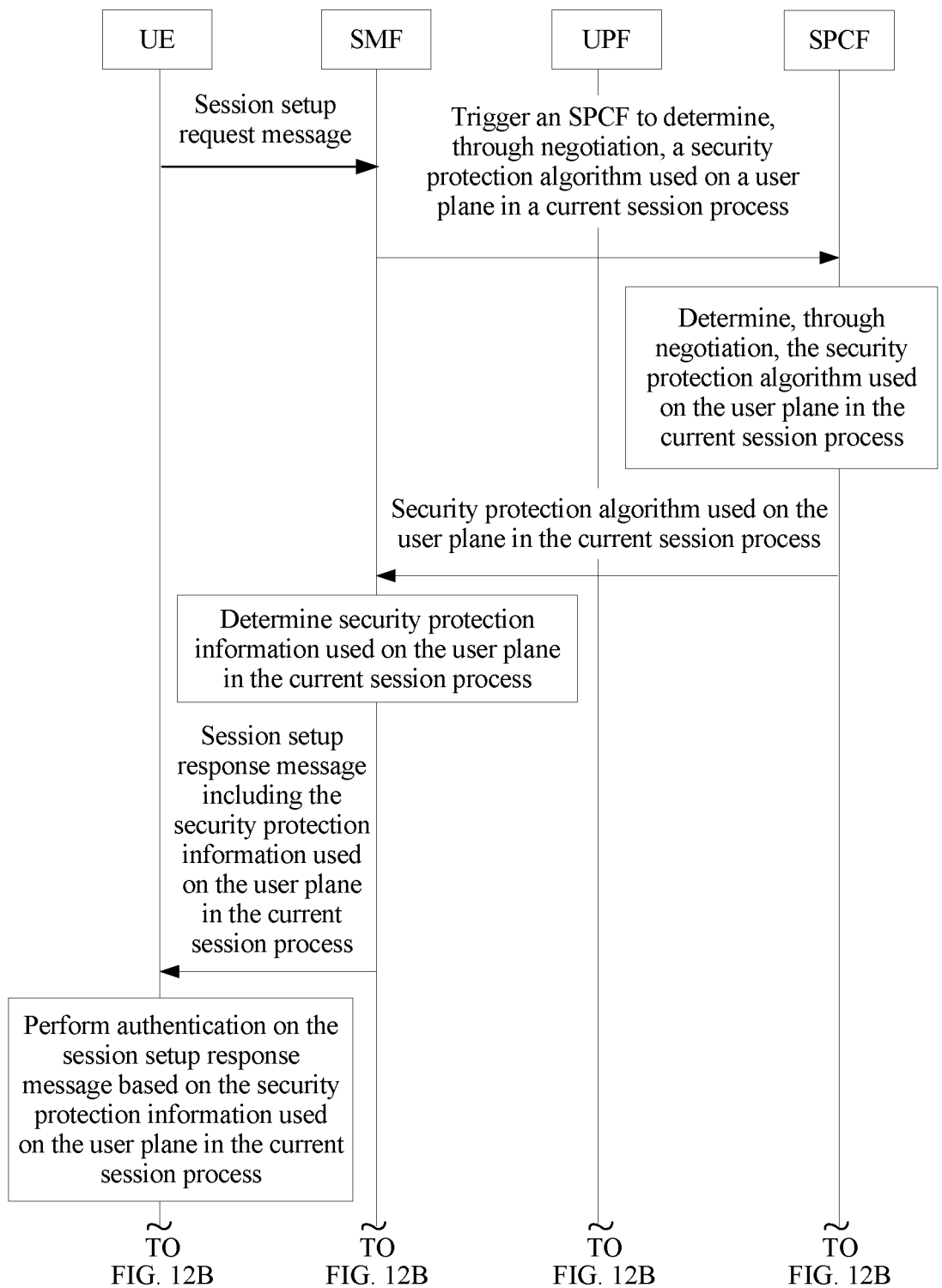
Figure 12B:
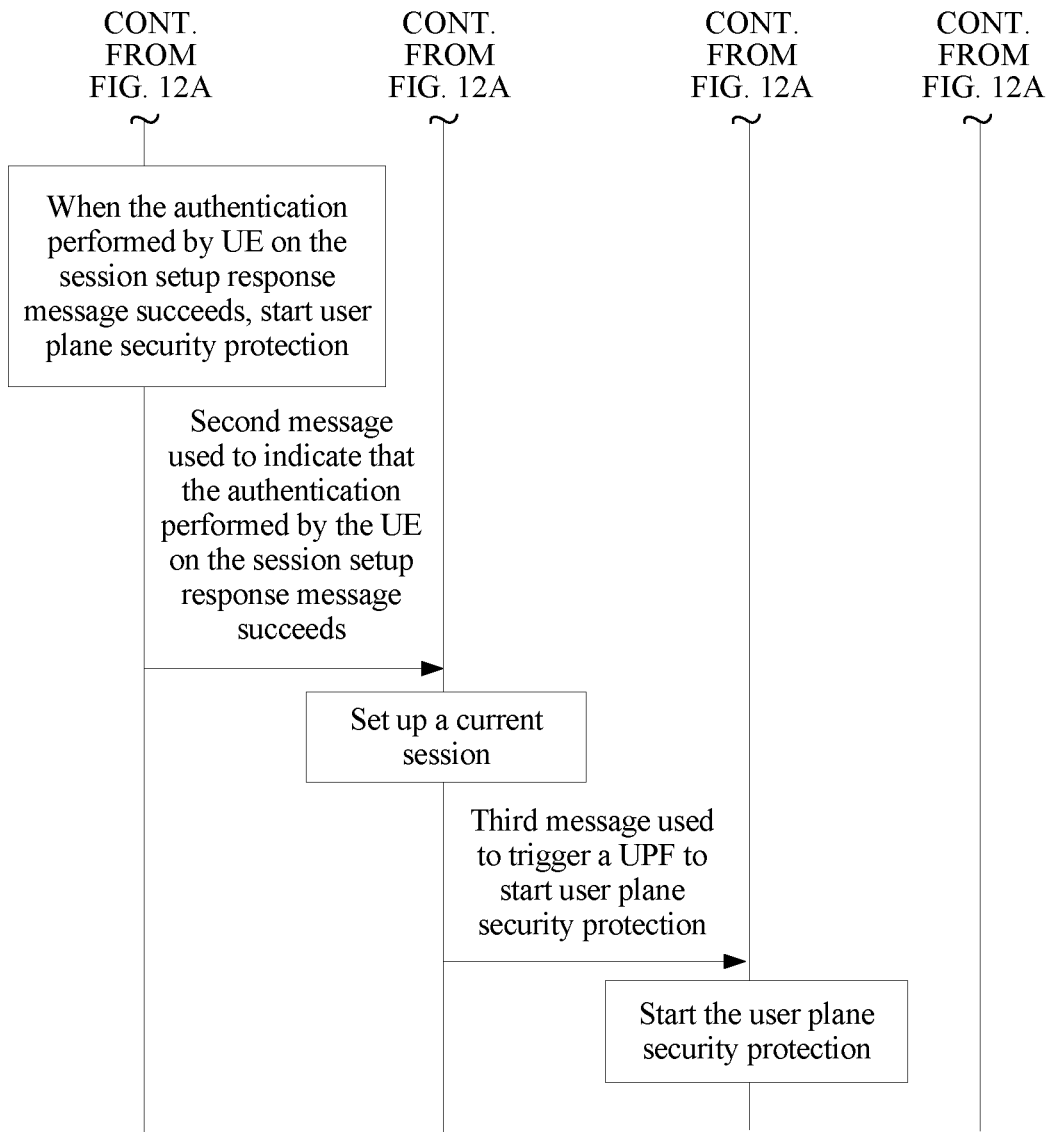

FIG. 12A and FIG. 12B are a schematic flowchart of a security protection negotiation method according to an embodiment. A main difference from the method shown in FIG. 7A and FIG. 7B is that in the method shown in FIG. 12A and FIG. 12B, a user plane security protection negotiation method in a current session process is combined with a process of setting up a current session.

In the method shown in FIG. 12A and FIG. 12B, before a user plane security protection negotiation process in the current session process is performed, UE sends, to an SMF, a session setup request message used to request to set up the current session. When the user plane security protection negotiation process in the current session process is performed, the SMF sends, to the UE by using a session setup response message, security protection information used on a user plane in the current session process. After determining that authentication performed by the UE on a first message succeeds, the SMF sets up the current session, and triggers a UPF to start user plane security protection. For the user plane security protection negotiation method in the current session process in the method shown in FIG. 12A and FIG. 12B, refer to the method shown in FIG. 7A and FIG. 7B. Details are not described herein again.

Example 10

Figure 13:
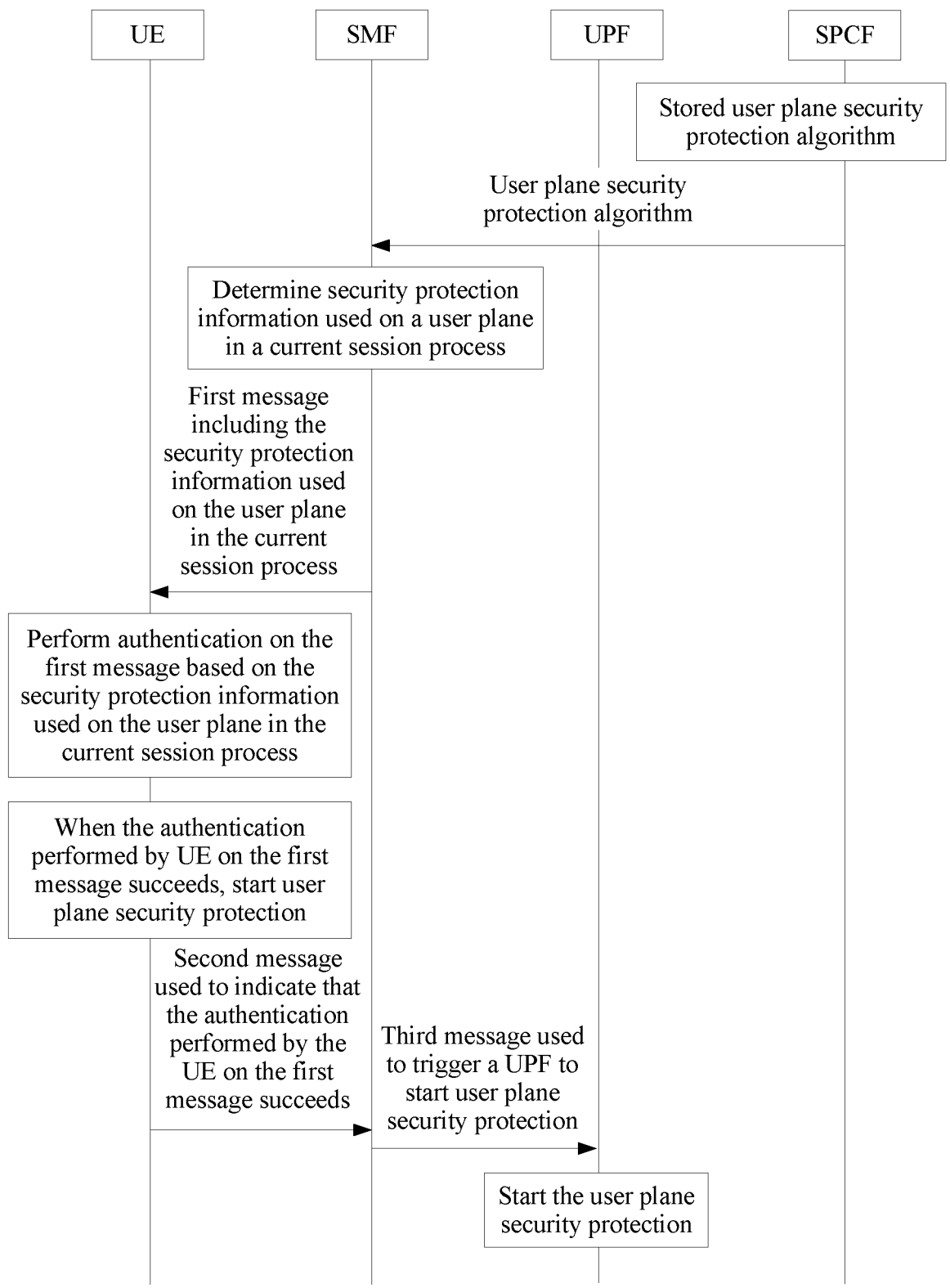

FIG. 13 is a schematic flowchart of a security protection negotiation method according to an embodiment. A main difference from the method shown in FIG. 3 is that in the method shown in FIG. 13, it is specified that an SPCF stores a user plane security protection algorithm, and after an SMF obtains the user plane security protection algorithm from the SPCF, the SMF autonomously determines, through negotiation, a security protection algorithm used on a user plane in a current session. For a user plane security protection negotiation method in the method shown in FIG. 13, refer to the method shown in FIG. 3. Details are not described herein again.

Example 11

Figure 14:
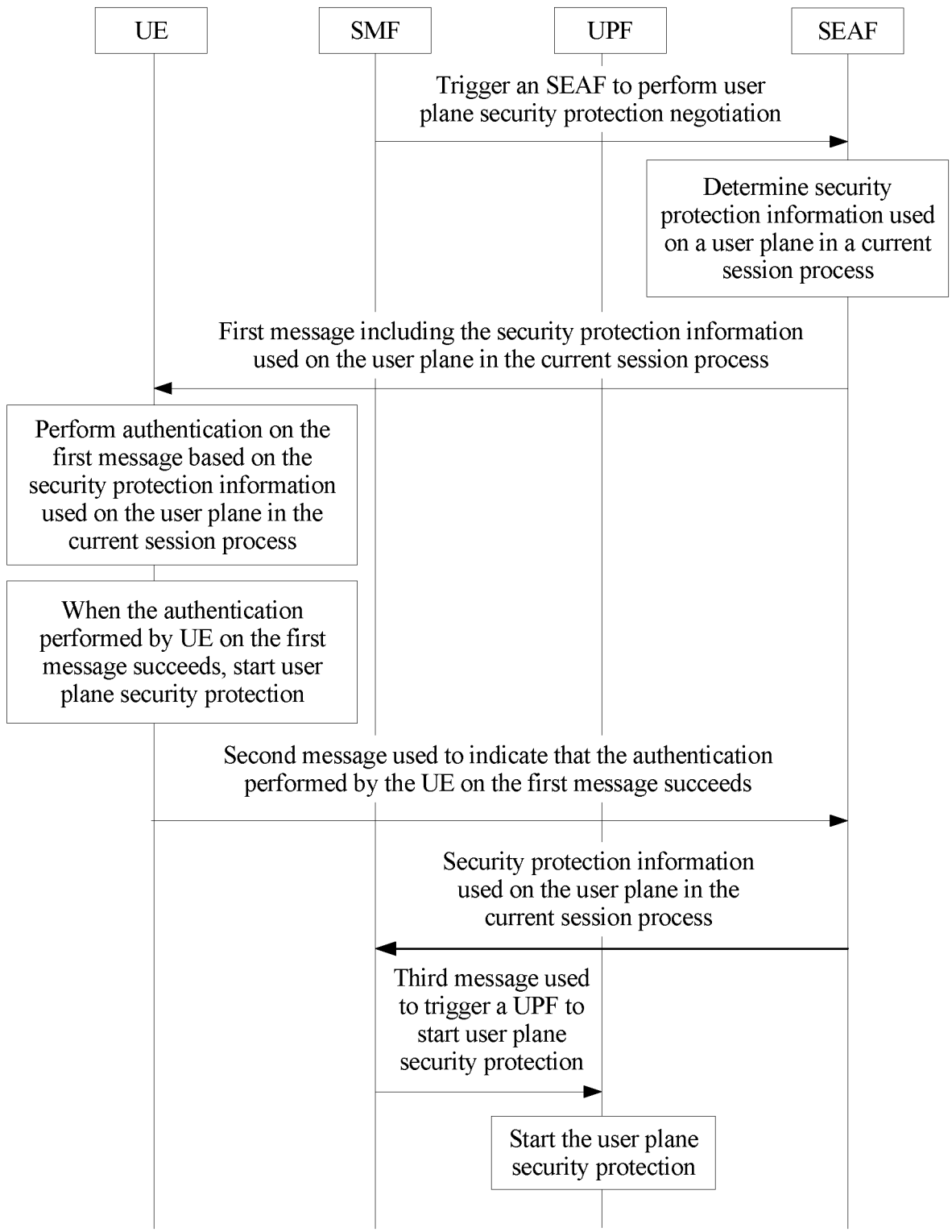

FIG. 14 is a schematic flowchart of a security protection negotiation method according to an embodiment. A main difference between the method shown in FIG. 14 and the method shown in FIG. 3 is as follows: An SMF triggers an SEAF to perform a user plane security protection negotiation process in a current session process. The SEAF and UE negotiate security protection information used on a user plane in the current session process. After the negotiation, the SEAF sends, to the SMF, the security protection information that is obtained through negotiation and that is used on the user plane in the current session process. The SMF triggers a UPF to start user plane security protection. For a user plane security protection negotiation method performed by the SEAF in the method shown in FIG. 14, refer to the user plane security protection negotiation method performed by the SMF in the method shown in FIG. 3. Details are not described herein again.

Example 12

Figure 15A:
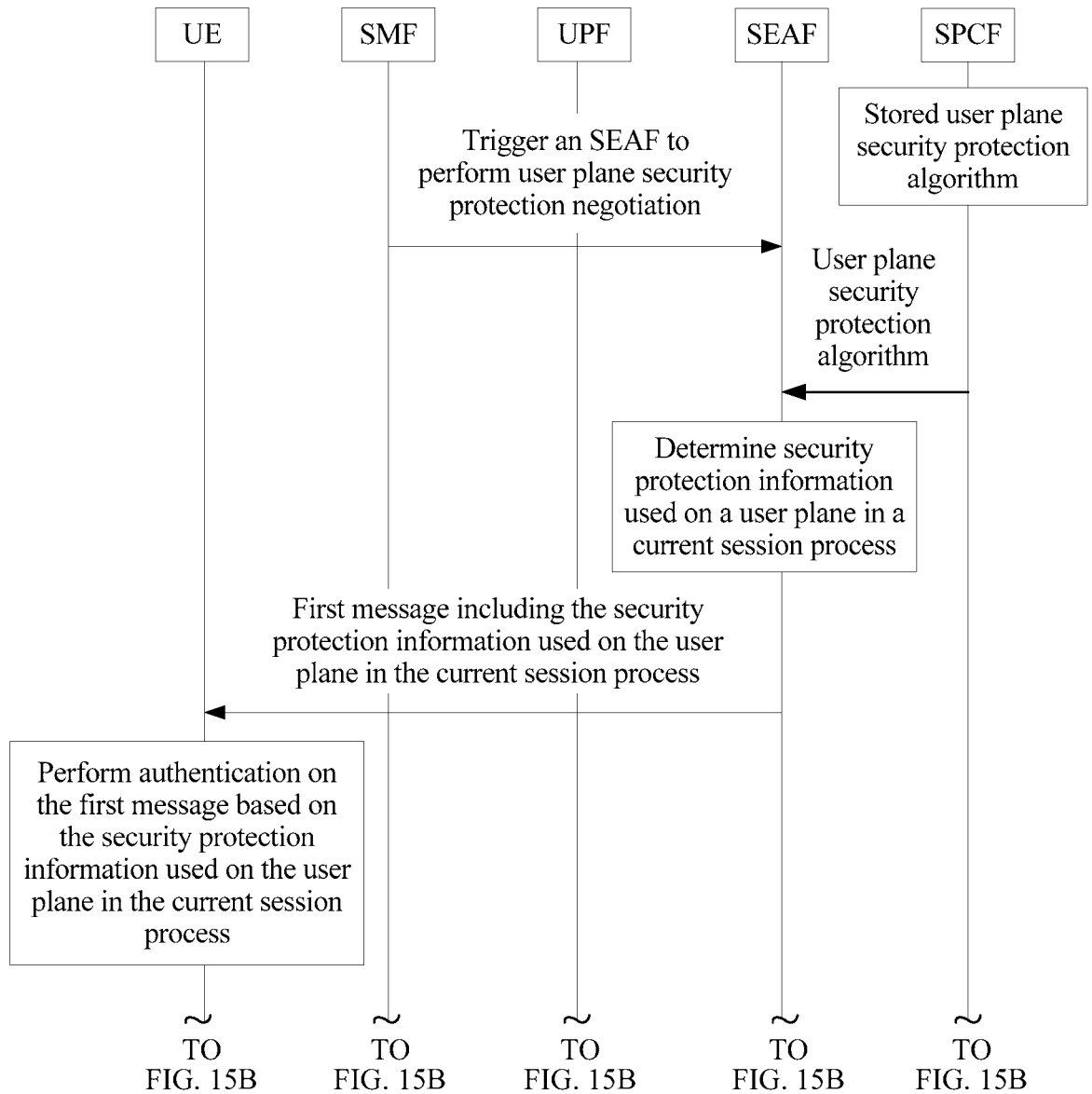
Figure 15B:
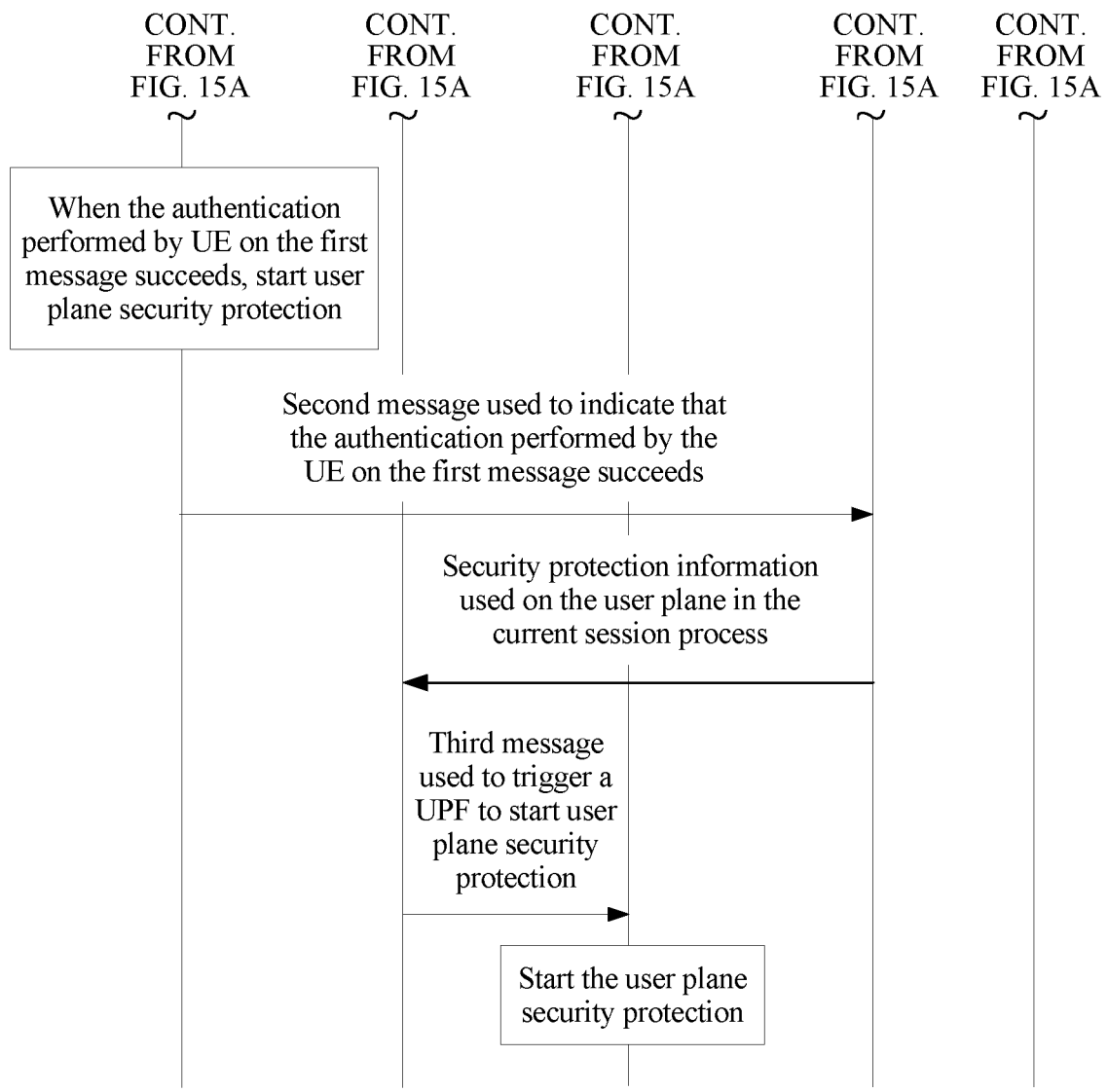

FIG. 15A and FIG. 15B are a schematic flowchart of a security protection negotiation method according to an embodiment. A main difference from the method shown in FIG. 14 is that in the method shown in FIG. 15A and FIG. 15B, it is specified that an SPCF stores a user plane security protection algorithm, and after an SEAF obtains the user plane security protection algorithm from the SPCF, the SEAF autonomously determines, through negotiation, a security protection algorithm used on a user plane in a current session process. For a user plane security protection negotiation method in the method shown in FIG. 15A and FIG. 15B, refer to the method shown in FIG. 14. Details are not described herein again.

Example 13

Figure 16:
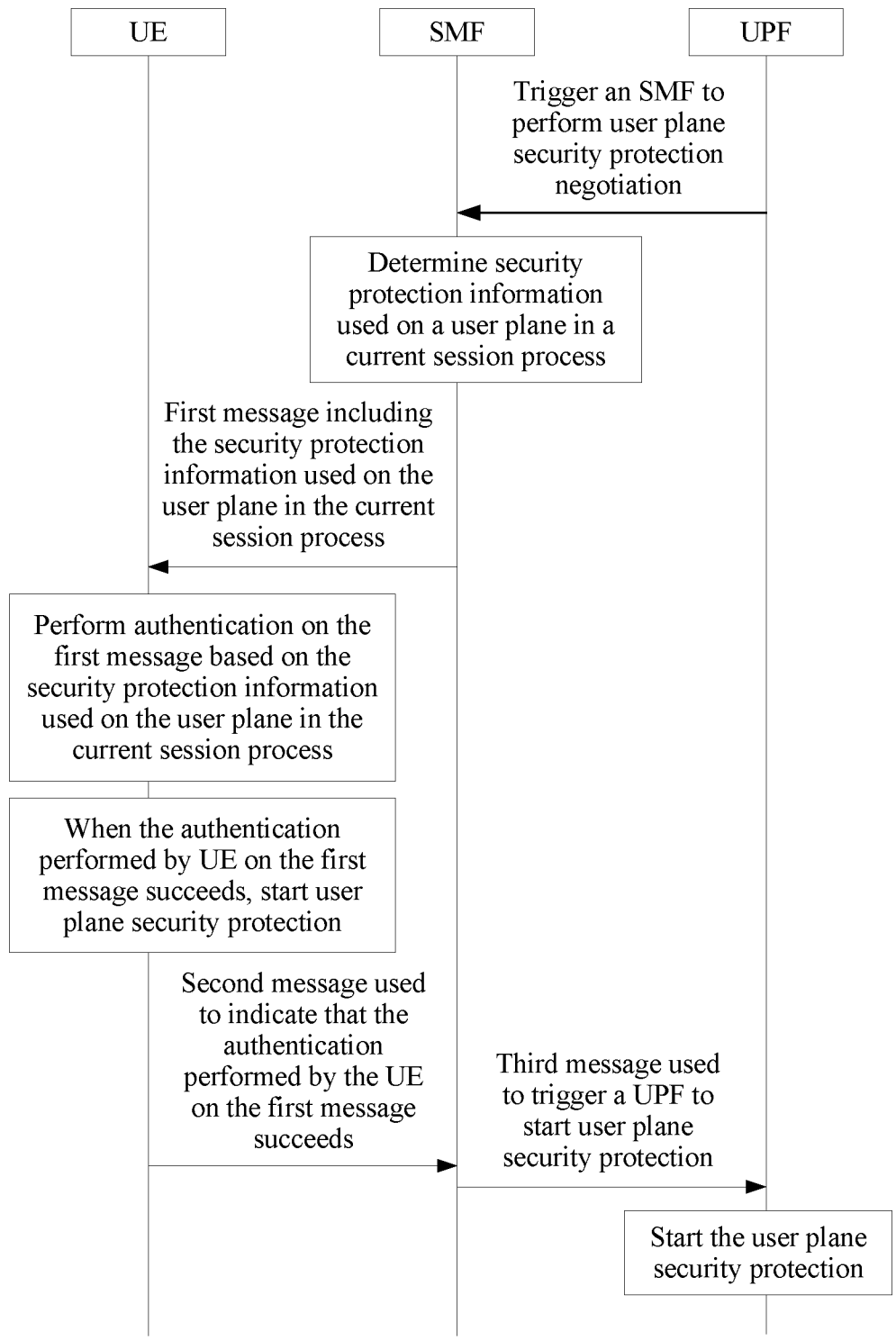

FIG. 16 is a schematic flowchart of a security protection negotiation method according to an embodiment. A main difference from the method shown in FIG. 3 is that in the method shown in FIG. 16, a UPF triggers an SMF to perform a user plane security protection negotiation process. For a user plane security protection negotiation method performed by the SMF in the method shown in FIG. 16, refer to the method shown in FIG. 3. Details are not described herein again.

Example 14

Figure 17A:
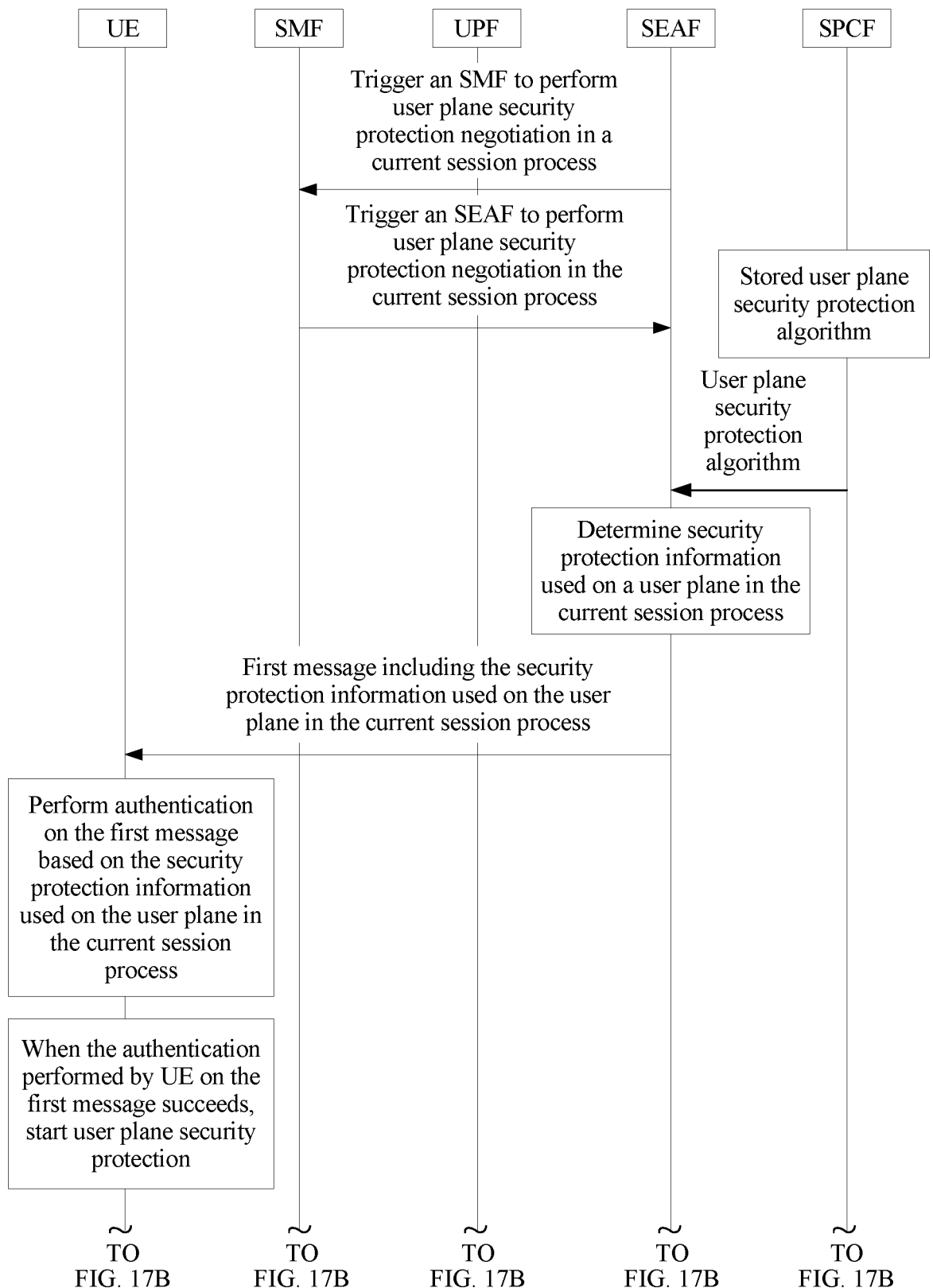
Figure 17B:
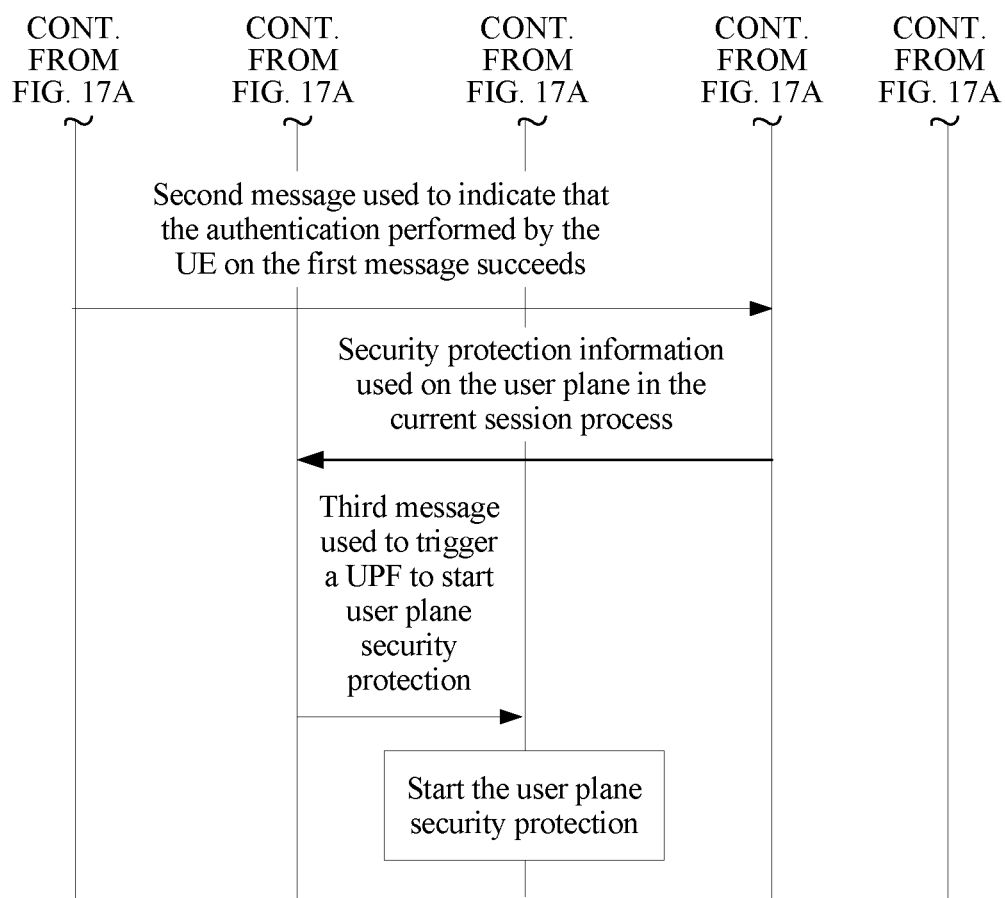

FIG. 17A and FIG. 17B are a schematic flowchart of a security protection negotiation method according to an embodiment. A main difference from the method shown in FIG. 15A and FIG. 15B is that in the method shown in FIG. 17A and FIG. 17B, a UPF triggers an SMF to perform a user plane security protection negotiation process, and then the SMF triggers an SEAF to perform a user plane security protection negotiation process. For a user plane security protection negotiation method performed by the SEAF in the method shown in FIG. 17A and FIG. 17B, refer to the method shown in FIG. 15A and FIG. 15B. Details are not described herein again.

Example 15

Figure 18A:
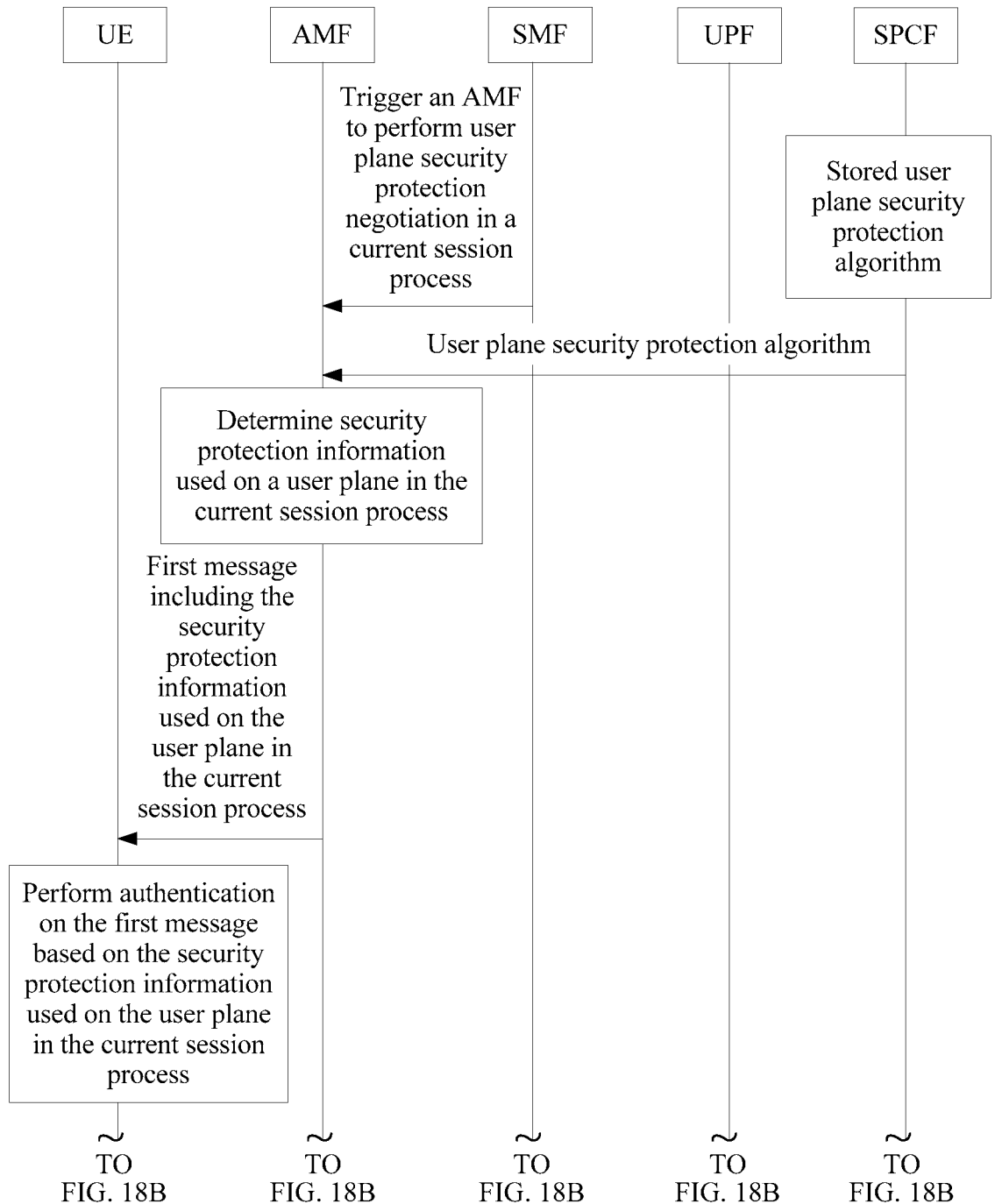
Figure 18B:
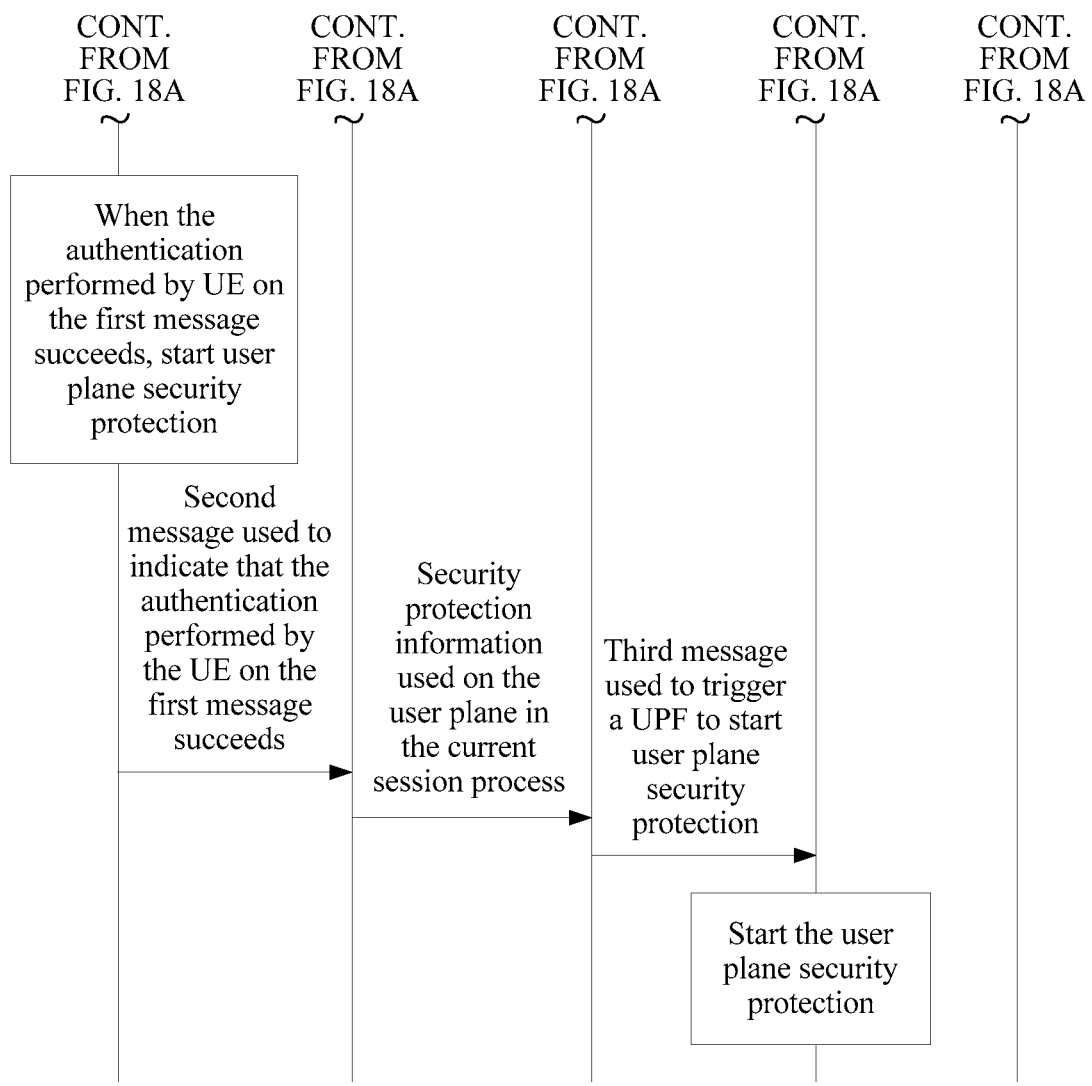

FIG. 18A and FIG. 18B are a schematic flowchart of a security protection negotiation method according to an embodiment. A main difference between the method shown in FIG. 18A and FIG. 18B and the method shown in FIG. 15A and FIG. 15B is as follows: An SMF triggers an access and mobility function (Access and Mobility Function, AMF) to perform a user plane security protection negotiation process. The AMF and UE negotiate security protection information used on a user plane in a current session process. After the negotiation, the AMF sends, to the SMF, the security protection information that is obtained through negotiation and that is used on the user plane in the current session process. The SMF triggers a UPF to start user plane security protection. For a user plane security protection negotiation method performed by the AMF in the method shown in FIG. 18A and FIG. 18B, refer to the user plane security protection negotiation method performed by an SMF in the method shown in FIG. 15A and FIG. 15B. Details are not described herein again. The AMF serves as a termination point of network authentication server (Network Authentication Server, NAS) signaling, and is configured to process signaling on a network.

Example 16

Figure 19A:
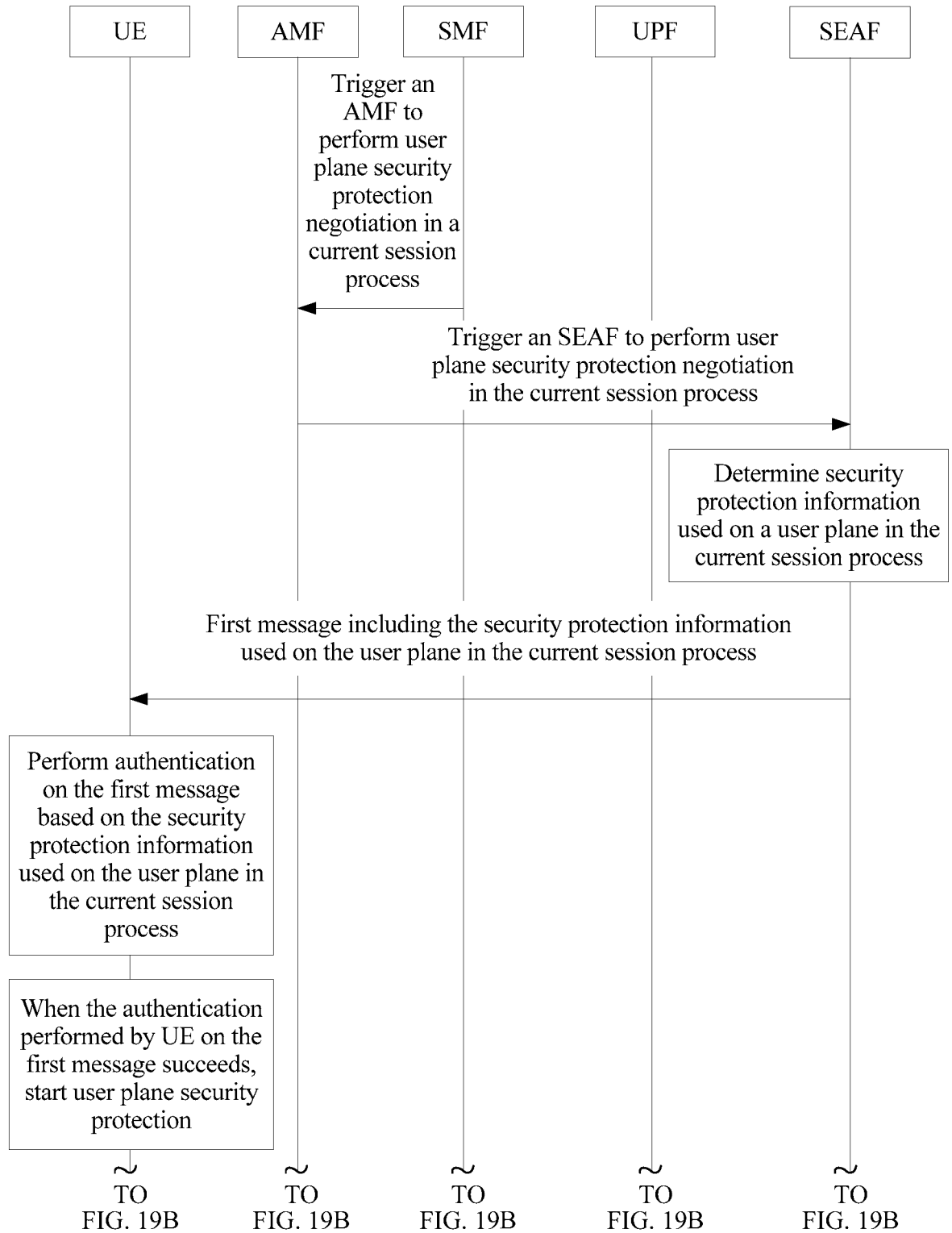
Figure 19B:
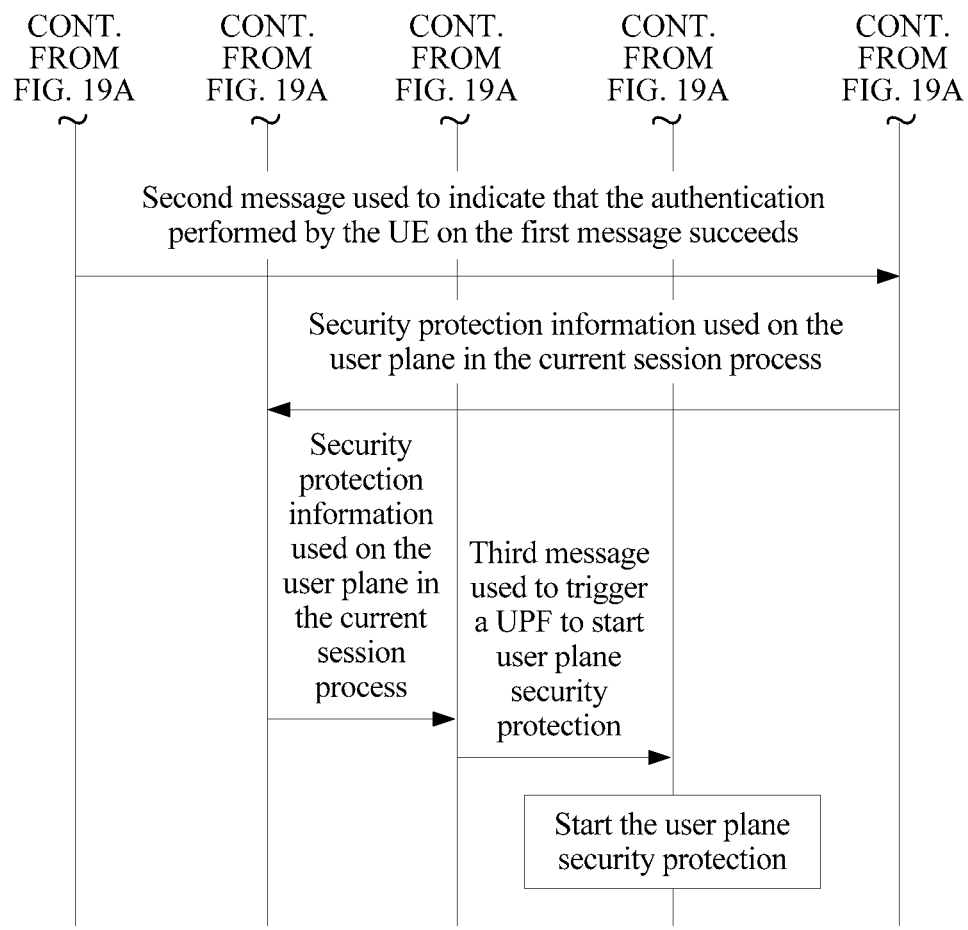

FIG. 19A and FIG. 19B are a schematic flowchart of a security protection negotiation method according to an embodiment. A main difference between the method shown in FIG. 19A and FIG. 19B and the method shown in FIG. 3 is as follows: An SMF triggers an AMF to perform a user plane security protection negotiation process, and then the AMF triggers an SEAF to perform a user plane security protection negotiation process. The SEAF and UE negotiate security protection information used on a user plane in a current session process. After the negotiation, the SEAF sends, to the SMF by using the AMF, the security protection information that is obtained through negotiation and that is used on the user plane in the current session process. The SMF triggers a UPF to start user plane security protection. For a user plane security protection negotiation method performed by the SEAF in the method shown in FIG. 19A and FIG. 19B, refer to the user plane security protection negotiation method performed by the SMF in the method shown in FIG. 3. Details are not described herein again.

Example 17

Figure 20:
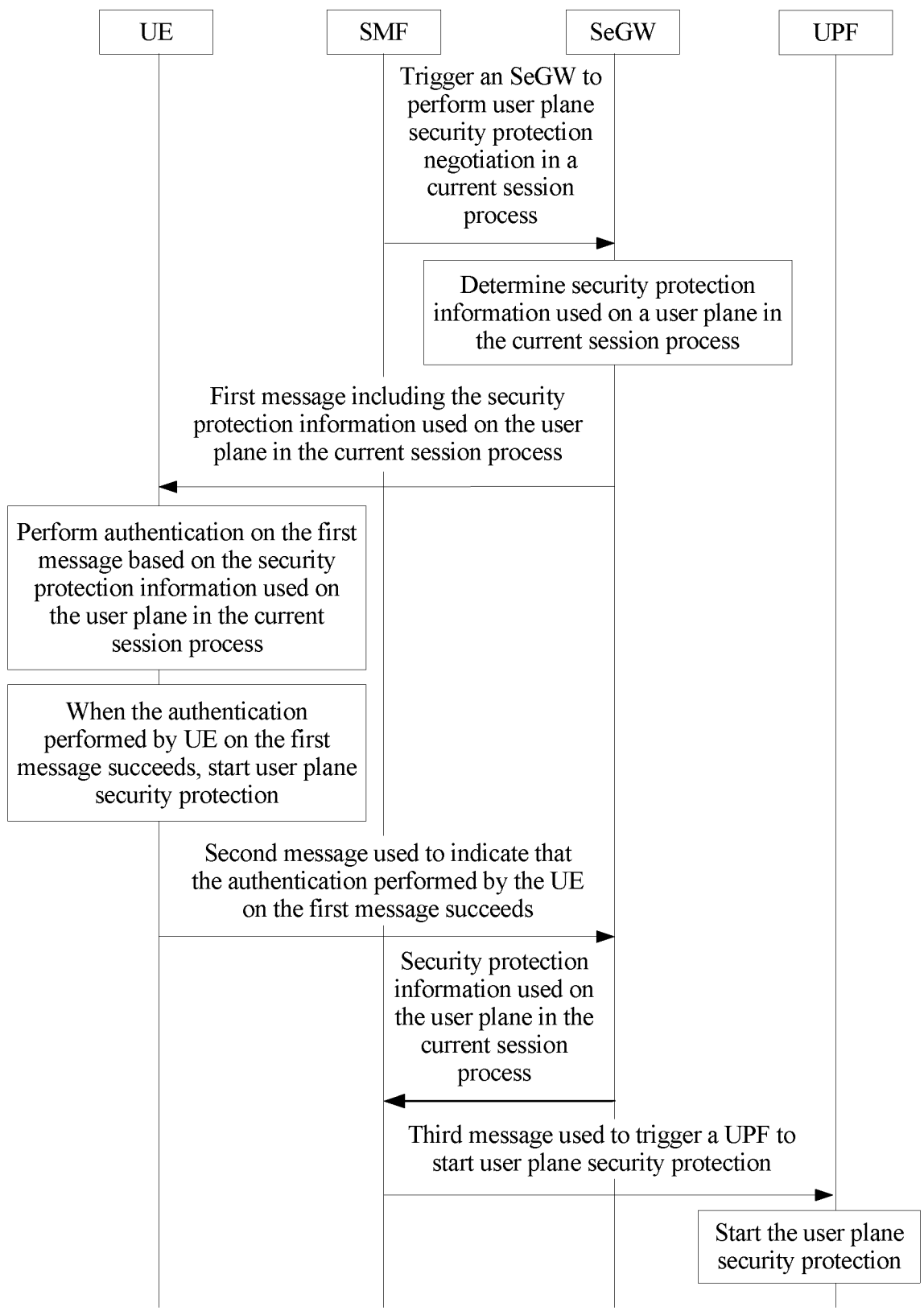

FIG. 20 is a schematic flowchart of a security protection negotiation method according to an embodiment. A main difference between the method shown in FIG. 20 and the method shown in FIG. 3 is as follows: An SMF triggers a security gateway (Security Gateway, SeGW) to perform a user plane security protection negotiation process. The SeGW and UE negotiate security protection information used on a user plane in a current session process. After the negotiation, the SeGW sends, to the SMF, the security protection information that is obtained through negotiation and that is used on the user plane in the current session process. The SMF triggers a UPF to start user plane security protection. For a user plane security protection negotiation method performed by the SeGW in the method shown in FIG. 20, refer to the user plane security protection negotiation method performed by the SMF in the method shown in FIG. 3. Details are not described herein again. Alternatively, in the method shown in FIG. 20, the SeGW may trigger the UPF to start the user plane security protection.

Example 18

Figure 21:
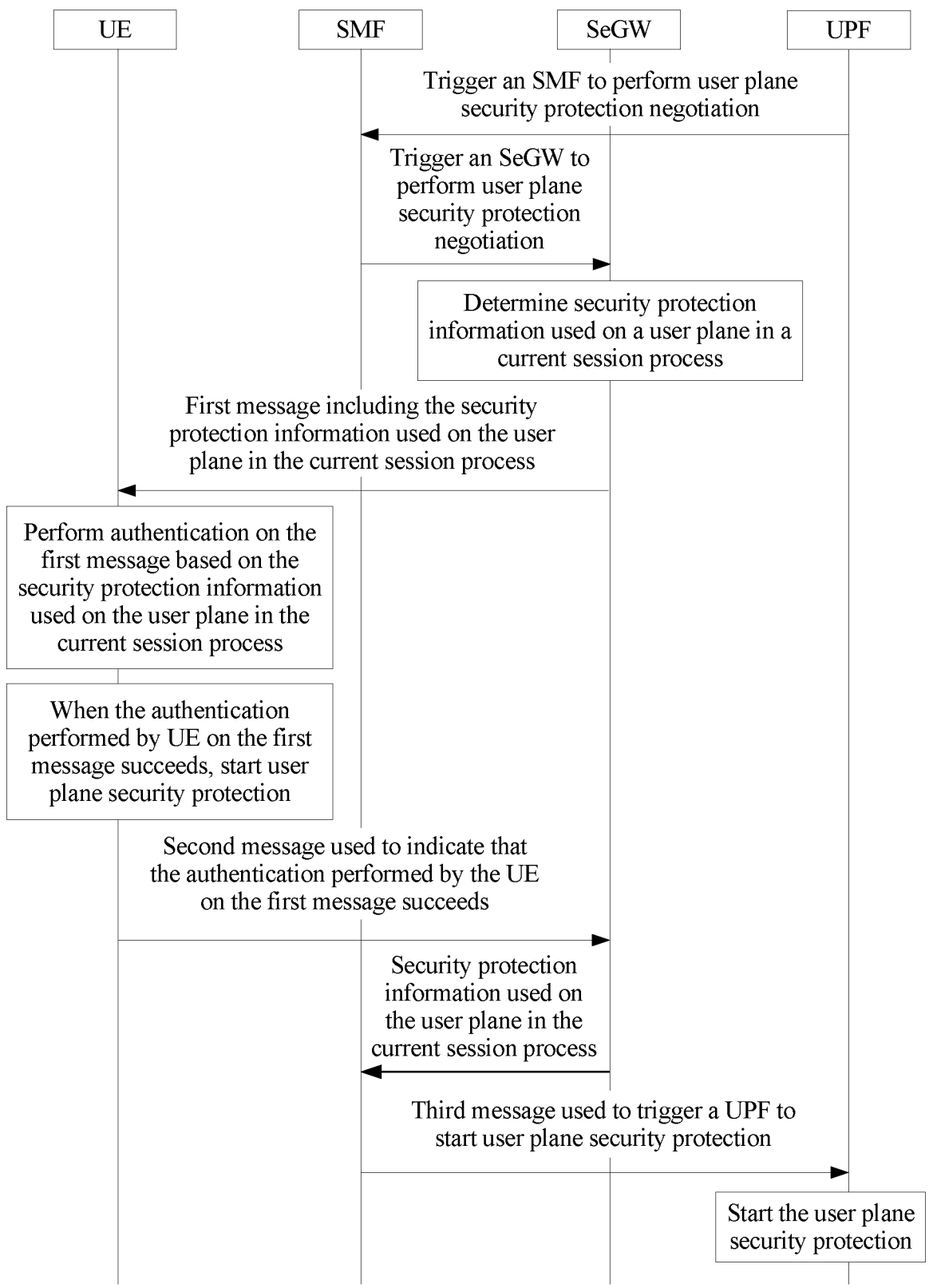

FIG. 21 is a schematic flowchart of a security protection negotiation method according to an embodiment. A main difference between the method shown in FIG. 21 and the method shown in FIG. 3 is as follows: A UPF triggers an SMF to perform a user plane security protection negotiation process, and then the SMF triggers an SeGW to perform a user plane security protection negotiation process. The SeGW and UE negotiate security protection information used on a user plane in a current session process. After the negotiation, the SeGW sends, to the SMF, the security protection information that is obtained through negotiation and that is used on the user plane in the current session process. The SMF triggers the UPF to start user plane security protection. For a user plane security protection negotiation method performed by the SeGW in the method shown in FIG. 21, refer to the user plane security protection negotiation method performed by the SMF in the method shown in FIG. 3. Details are not described herein again. Alternatively, in the method shown in FIG. 21, the SeGW may trigger the UPF to start the user plane security protection in a current session.

It should be noted that implementations of various extensions and variations provided in the embodiments for the user plane security protection negotiation method may be used in a combination manner, and are limited to implementations shown in the embodiments.

In the security protection negotiation method provided in the embodiments of this application, the SMF determines the security protection information used on the user plane in the current session process and sends the security protection information to the UE. The security protection information includes the security protection algorithm, the index used to identify the security protection context, the message authentication code, and the like. After the authentication performed by the UE succeeds, the UE and the UPF are triggered to start respective user plane security protection. The security protection includes the encryption and decryption protection and the integrity protection. In this way, the UE and the UPF negotiate to start the respective user plane security protection. Because a user plane connection in a 5G network architecture is set up based on a session, and according to the method provided in the embodiments of this application, the UE and the UPF can negotiate to start respective session granularity-based user plane security protection, the method provided in the embodiments of this disclosure can meet a requirement of the 5G network architecture for user plane security protection.

It should be noted that in the embodiments, a related network element such as the SMF, the SEAF, or the SPCF may decide the termination point of the user plane in the current session process. The termination point of the user plane is a network element that needs to start user plane security protection other than the UE. In the embodiments, the termination point of the user plane may be the UPF or a gNB. The gNB may be construed as a next generation NodeB (next generation Node Base station). The gNB is a network element of a RAN. When the termination point of the user plane is the UPF, a method for implementing negotiation between the UE and the UPF to start user plane security protection is described in detail above. When the termination point of the user plane is the gNB, a method for implementing negotiation between the UE and the gNB to start user plane security protection is described in detail below.

Figure 22:
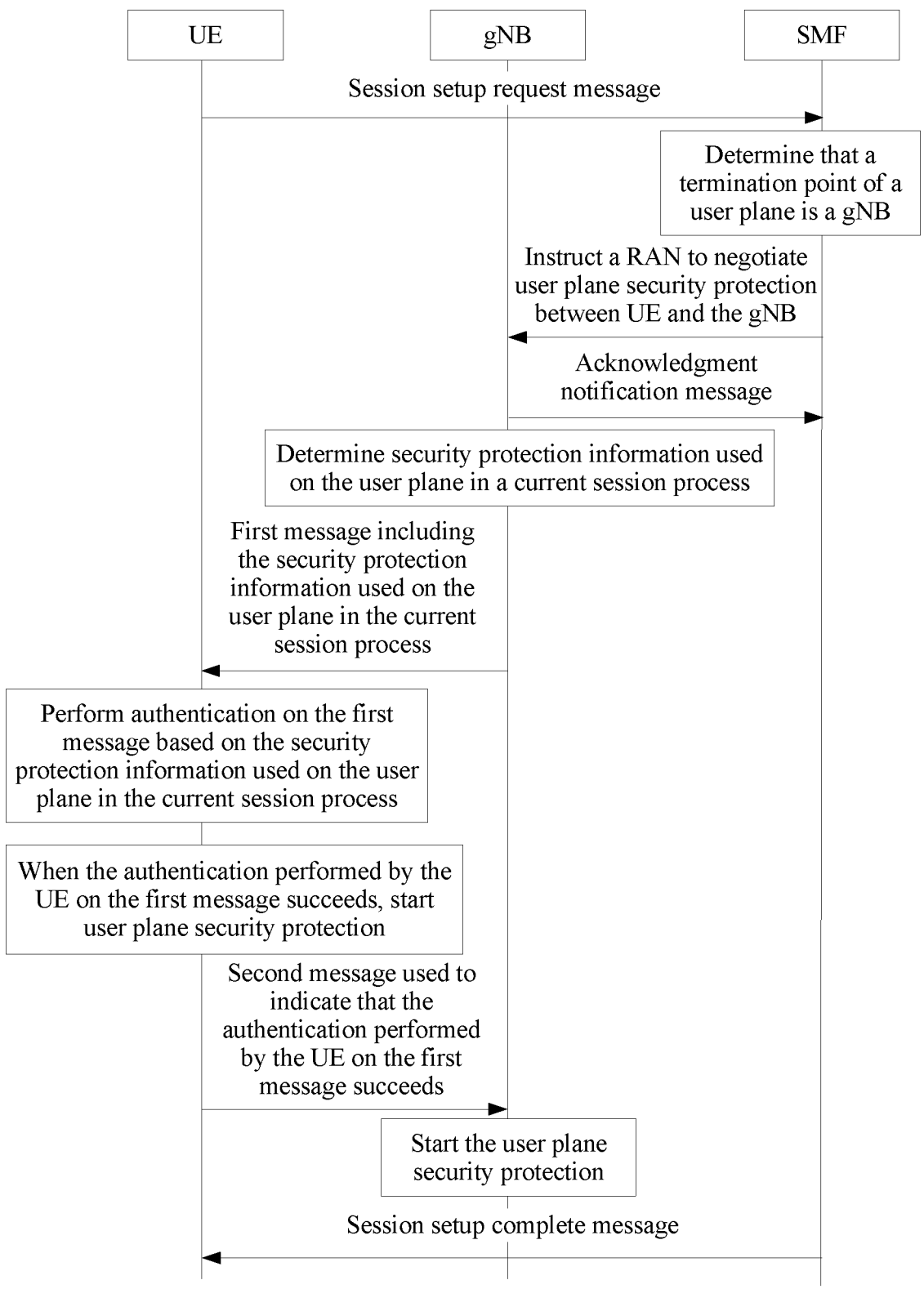
FIG. 22 is a schematic flowchart of another security protection negotiation method according to an embodiment of the present disclosure.

This embodiment of this disclosure further provides a security protection negotiation method, to implement negotiation between UE and a gNB to start user plane security protection. The method is performed in a session setup process. A procedure of interaction between network elements in the method is shown in FIG. 22. A main difference between the method shown in FIG. 22 and the method shown in FIG. 3 is as follows: After an SMF receives a session setup request message that is sent by the UE and that is used to request to set up a current session, the SMF determines that a termination point of a user plane is the gNB. The SMF sends a notification message to a RAN. The notification message is used to instruct the RAN to perform a user plane security protection negotiation method between the UE and the gNB. After receiving the notification message, the RAN returns acknowledgement information to the SMF, and performs the user plane security protection negotiation method between the UE and the gNB. When the termination point of the user plane is the gNB, the UE may have completed user plane security protection negotiation by using a security protection negotiation procedure between the UE and the gNB during initial access.

For the user plane security protection negotiation method between the UE and the gNB that is performed by the RAN in the method shown in FIG. 22, refer to the user plane security protection negotiation method between the UE and the UPF that is performed by the SMF in the method shown in FIG. 3. However, a difference is that a network element that performs a negotiation method is the gNB, and a network element that needs to start user plane security protection other than the UE is the gNB.

It should be noted that based on the security protection negotiation method shown in FIG. 22, the method may be appropriately extended and modified in this embodiment. For a solution of extending and modifying the method shown in FIG. 22, refer to the foregoing solution of extending and modifying the method shown in FIG. 3. For example, the method may be extended and modified in the following aspects: occasions on which the UE and the gNB start user plane security protection, a network element (which may be an SPCF, an SEAF, or an AUSF) that determines, through negotiation, a security protection algorithm used on the user plane in a current session process, a network element that triggers the RAN to perform the user plane security protection negotiation method between the UE and the gNB, and the like.

According to the security protection negotiation method shown in FIG. 22, the UE and the gNB can negotiate to start respective user plane security protection. Because a user plane connection in a 5G network architecture is set up based on a session, and according to the method shown in FIG. 22, the UE and the gNB can negotiate to start respective session granularity-based user plane security protection, the method shown in FIG. 22 can meet a requirement of the 5G network architecture for user plane security protection.

Figure 23A:
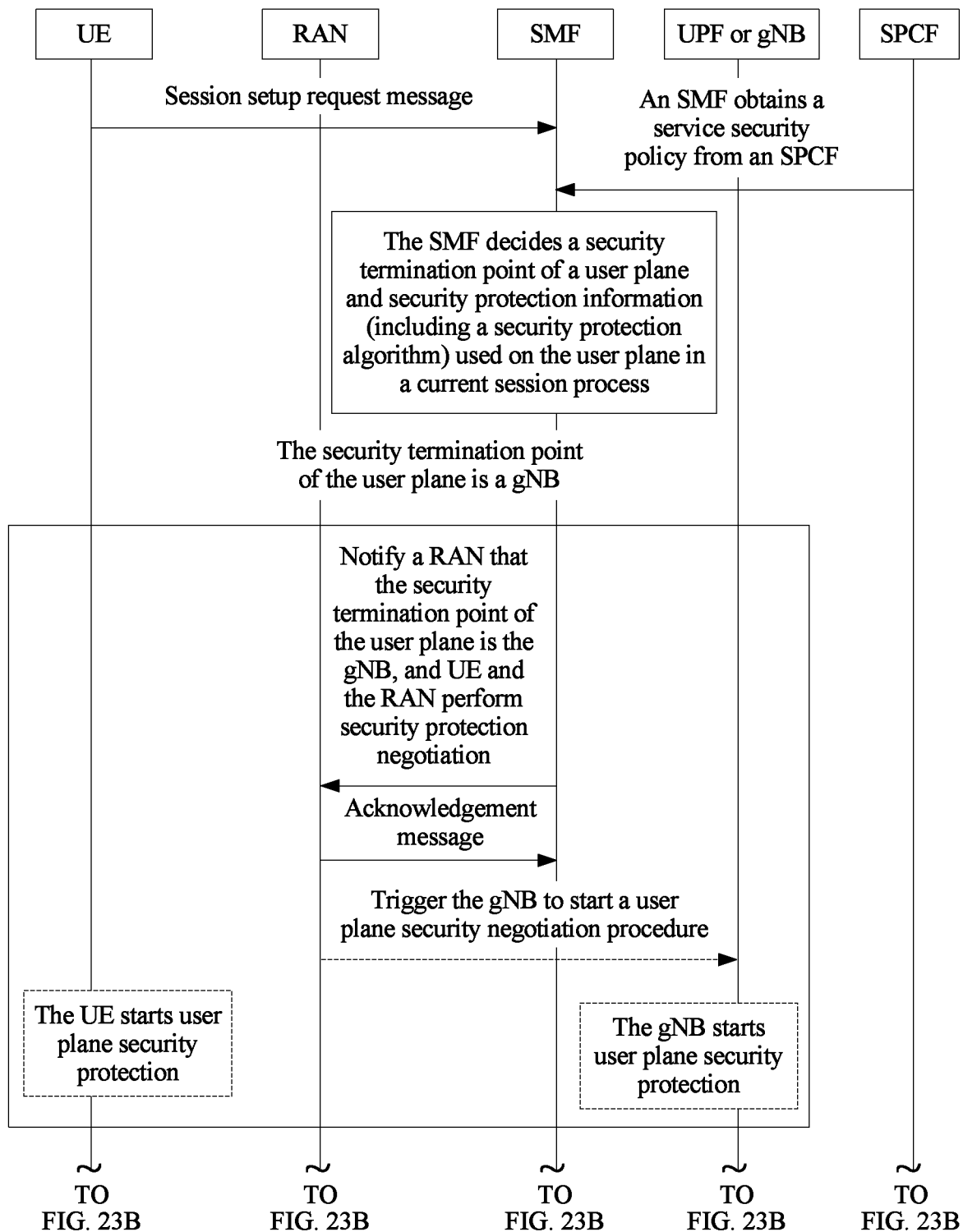
FIG. 23A and FIG. 23B are a schematic flowchart of a security protection negotiation method provided with reference to FIG. 3 and FIG. 22 according to an embodiment of the present disclosure.
Figure 23B:
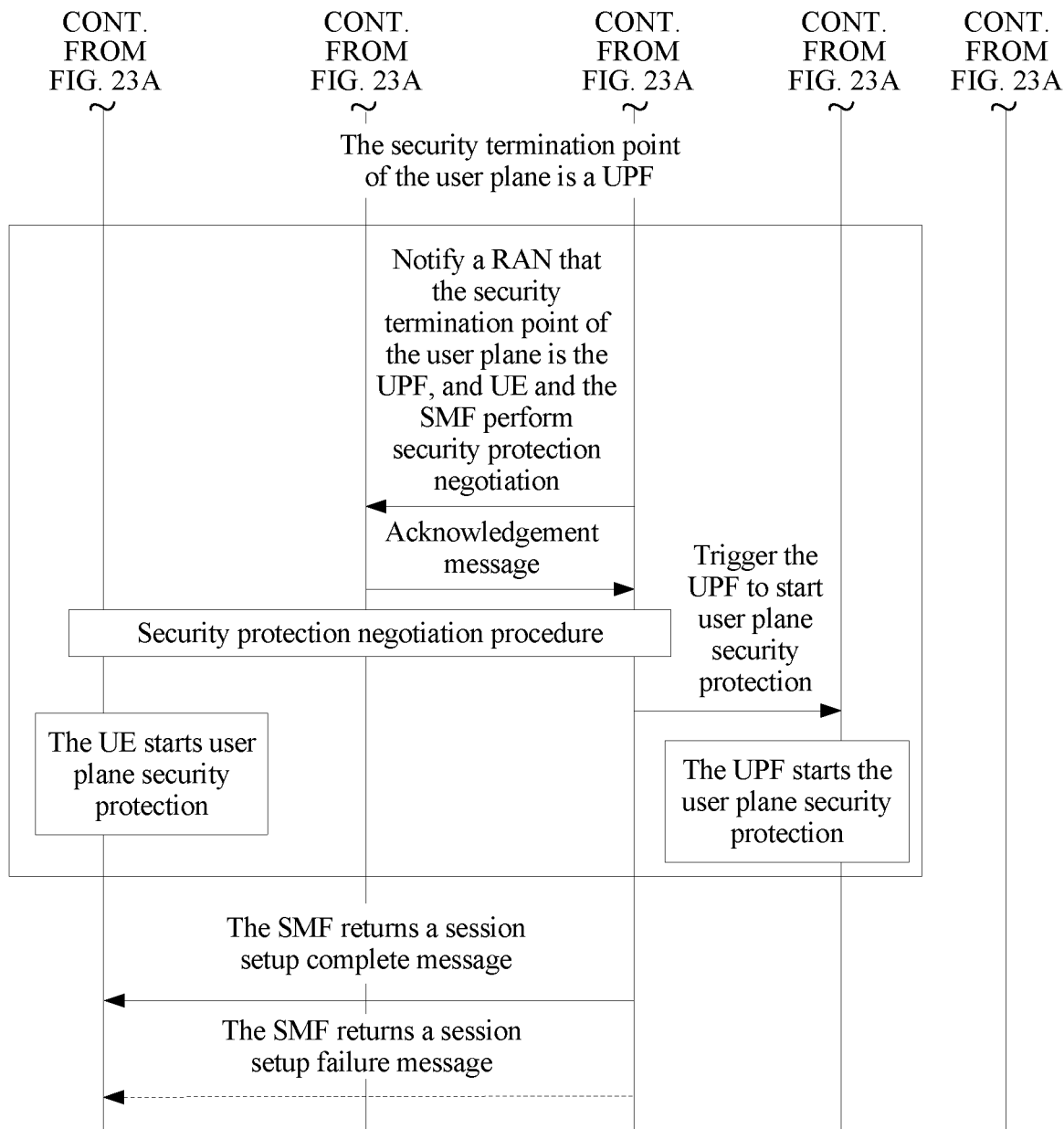

With reference to the method shown in FIG. 3 and the method shown in FIG. 22, this embodiment of this disclosure provides a security protection negotiation method shown in FIG. 23A and FIG. 23B. For specific content of the method shown in FIG. 23A and FIG. 23B, refer to FIG. 3 and FIG. 22. Details are not described herein again.

Embodiment 2

Figure 24:
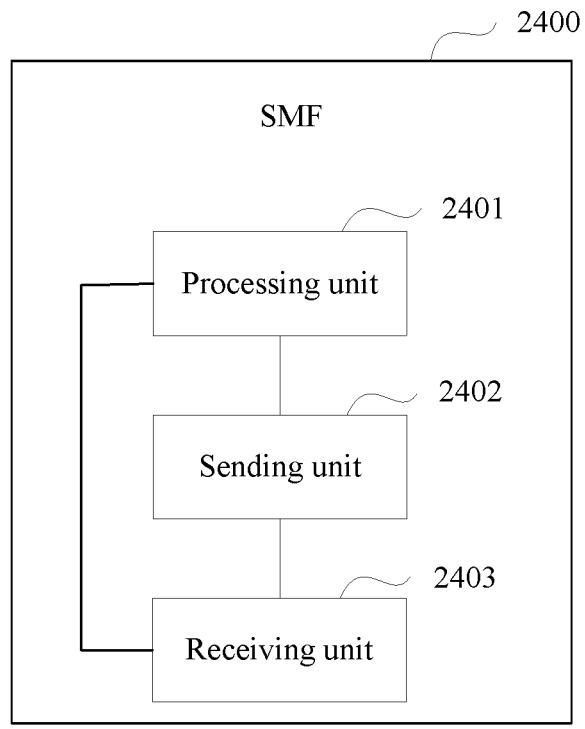
FIG. 24 is a schematic structural diagram of an SMF according to an embodiment of the present disclosure.

Based on a same inventive concept, this embodiment of this disclosure further provides a session management function SMF 2400. The SMF can perform, on an SMF side, the security protection negotiation method provided in Embodiment 1. Referring to FIG. 24, the SMF 2400 includes a processing unit 2401, a sending unit 2402, and a receiving unit 2403.

The processing unit 2401 is configured to determine security protection information used on a user plane in a current session process, where the security protection information includes a security protection algorithm, an index used to identify a security protection context, and a message authentication code, security protection includes encryption and decryption protection and integrity protection, and the message authentication code is an authentication code generated after integrity protection is performed on a first message by using an integrity protection algorithm and an integrity protection key that is included in the security protection context identified by using the index.

The sending unit 2402 is configured to send, to UE, the first message including the security protection information that is determined by the processing unit 2401 and that is used on the user plane, where the security protection information used on the user plane is used by the UE to start user plane security protection after integrity protection authentication performed by the UE on the first message based on the security protection information used on the user plane succeeds.

The receiving unit 2403 is configured to receive a second message that is sent by the UE and that is used to indicate that the authentication performed by the UE on the first message succeeds.

The sending unit 2402 is further configured to send, to a user plane function UPF, a third message including the security protection algorithm and the security protection context that are determined by the processing unit 2401 and that are used on the user plane in the current session process, where the third message is used to trigger the UPF to start user plane security protection based on the security protection algorithm and the security protection context.

In an implementation, when determining the security protection algorithm, the processing unit 2401 is specifically configured to:

obtain, from a security policy control function SPCF, the security protection algorithm determined by the SPCF through negotiation; or autonomously determine the security protection algorithm through negotiation.

In an implementation, the SPCF is deployed on any one of the SMF, a security anchor function SEAF, and an authentication server function AUSF, or the SPCF is independently deployed on a network.

In an implementation, the security protection algorithm is determined through negotiation based on a security protection algorithm supported by the UE, a security protection algorithm supported by the network, and a security protection algorithm supported by a service to which a current session belongs.

In an implementation, the processing unit 2401 is further configured to set up the current session before determining the security protection information used on the user plane; or the receiving unit 2403 is further configured to: before the processing unit 2401 determines the security protection information used on the user plane, receive a session setup request message that is sent by the UE and that is used to request to set up the current session; and when sending, to the UE, the first message including the security protection information used on the user plane, the sending unit 2402 is specifically configured to send, to the UE, a session setup complete message including the security protection information used on the user plane.

In an implementation, the processing unit 2401 is further configured to: after the receiving unit 2403 receives the session setup request message that is sent by the UE and that is used to request to set up the current session, determine that a security termination point of the user plane is the UPF; and the sending unit 2402 is further configured to: after the processing unit 2401 determines that the security termination point of the user plane is the UPF, send, to a radio access network RAN, a notification message used to instruct the SMF to perform the security protection negotiation method.

In an implementation, the receiving unit 2403 is further configured to: after the sending unit 2402 sends, to the UE, the first message including the security protection information used on the user plane, receive a fourth message that is sent by the UE and that is used to indicate that the authentication performed by the UE on the first message fails; and the processing unit 2401 is further configured to determine, according to an indication of the fourth message received by the receiving unit 2403, that the UPF does not need to be triggered to start the user plane security protection.

It should be noted that for specific function descriptions of the foregoing units, refer to the security protection negotiation method provided in Embodiment 1. Details are not described herein again. In this embodiment of this application, unit division is an example, and is merely logical function division. There may be other division manners in actual implementations. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this disclosure, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor (processor) to perform all or some of the steps of the methods in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Figure 25:
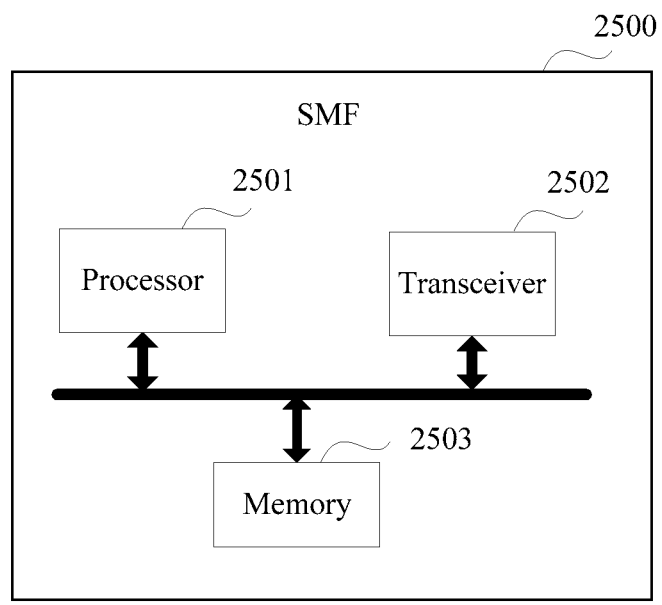
FIG. 25 is a schematic structural diagram of another SMF according to an embodiment of the present disclosure.

Based on a same inventive concept, this embodiment of this disclosure further provides an SMF. The SMF can perform, on an SMF side, the security protection negotiation method provided in Embodiment 1, and may be a same network element as the SMF shown in FIG. 24. Referring to FIG. 25, the SMF 2500 includes a processor 2501, a transceiver 2502, and a memory 2503.

The processor 2501 is configured to read a program in the memory 2503, to perform the following process.

The processor 2501 is configured to determine security protection information used on a user plane in a current session process, where the security protection information includes a security protection algorithm, an index used to identify a security protection context, and a message authentication code, security protection includes encryption and decryption protection and integrity protection, and the message authentication code is an authentication code generated after integrity protection is performed on a first message by using an integrity protection algorithm and an integrity protection key that is included in the security protection context identified by using the index.

The processor 2501 is further configured to control the transceiver 2502 to send, to UE, the first message including the security protection information used on the user plane, where the security protection information used on the user plane is used by the UE to start user plane security protection after integrity protection authentication performed by the UE on the first message based on the security protection information used on the user plane succeeds.

The processor 2501 is further configured to: control the transceiver 2502 to receive a second message that is sent by the UE and that is used to indicate that the authentication performed by the UE on the first message succeeds, and control the transceiver 2502 to send, to a user plane function UPF, a third message including the security protection algorithm and the security protection context that are used on the user plane in the current session process, where the third message is used to trigger the UPF to start user plane security protection based on the security protection algorithm and the security protection context.

In an implementation, when determining the security protection algorithm, the processor 2501 is specifically configured to:

obtain, from a security policy control function SPCF, the security protection algorithm determined by the SPCF through negotiation; or autonomously determine the security protection algorithm through negotiation.

In an implementation, the SPCF is deployed on any one of the SMF, a security anchor function SEAF, and an authentication server function AUSF, or the SPCF is independently deployed on a network.

In an implementation, the security protection algorithm is determined through negotiation based on a security protection algorithm supported by the UE, a security protection algorithm supported by the network, and a security protection algorithm supported by a service to which a current session belongs.

In an implementation, the processor 2501 is further configured to set up the current session before determining the security protection information used on the user plane; or the processor 2501 is further configured to: before determining the security protection information used on the user plane, control the transceiver 2502 to receive a session setup request message that is sent by the UE and that is used to request to set up the current session; and when controlling the transceiver 2502 to send, to the UE, the first message including the security protection information used on the user plane, the processor 2501 is specifically configured to control the transceiver 2502 to send, to the UE, a session setup complete message including the security protection information used on the user plane.

In an implementation, the processor 2501 is further configured to: after controlling the transceiver 2502 to receive the session setup request message that is sent by the UE and that is used to request to set up the current session, determine that a security termination point of the user plane is the UPF, and control the transceiver 2502 to send, to a radio access network RAN, a notification message used to instruct the SMF to perform the security protection negotiation method.

In an implementation, the processor 2501 is further configured to: after controlling the transceiver 2502 to send, to the UE, the first message including the security protection information used on the user plane, control the transceiver 2502 to receive a fourth message that is sent by the UE and that is used to indicate that the authentication performed by the UE on the first message fails, and determine, according to an indication of the fourth message, that the UPF does not need to be triggered to start the user plane security protection.

The memory 2503 may store data used by the processor 2501 when the processor 2501 performs an operation. The memory 2503 may be an internal memory of a physical host that carries an SDN controller, for example, a hard disk, a USB flash drive, or a secure digital (Secure Digital, SD) card.

This embodiment further provides a computer storage medium, configured to store a computer software instruction used by the SMF in the foregoing embodiments. The computer software instruction includes a program designed for performing the foregoing embodiments.

Embodiment 3

Figure 26:
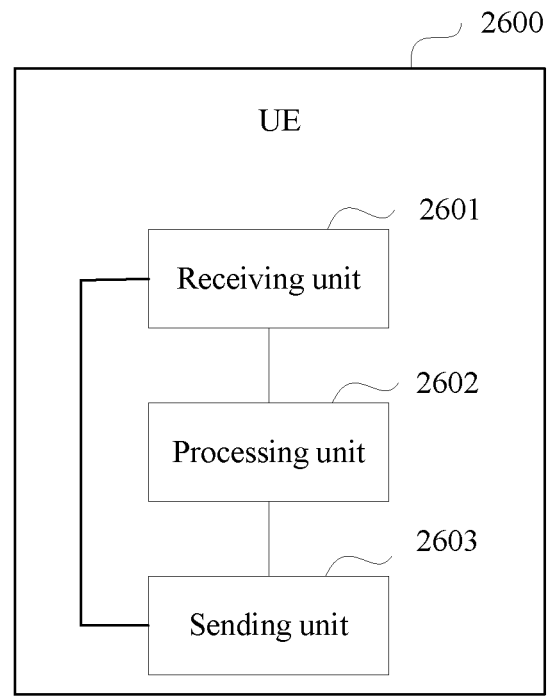
FIG. 26 is a schematic structural diagram of UE according to an embodiment of the present disclosure.

Based on a same inventive concept, this embodiment of this disclosure further provides user equipment UE. The UE can perform, on a UE side, the security protection negotiation method provided in Embodiment 1. Referring to FIG. 26, the UE 2600 includes a receiving unit 2601, a processing unit 2602, and a sending unit 2603.

The receiving unit 2601 is configured to receive a first message that is sent by a session management function SMF and that includes security protection information used on a user plane in a current session process, where the security protection information includes a security protection algorithm, an index used to identify a security protection context, and a message authentication code, the security protection includes encryption and decryption protection and integrity protection, and the message authentication code is an authentication code generated after the SMF performs integrity protection on the first message by using an integrity protection algorithm and an integrity protection key that is included in the security protection context identified by using the index.

The processing unit 2602 is configured to: perform authentication on the first message based on the security protection information that is received by the receiving unit 2601 and that is used on the user plane, and when the authentication on the first message succeeds, start user plane security protection.

The sending unit 2603 is configured to: when the authentication performed by the processing unit 2602 on the first message succeeds, send, to the SMF, a second message used to indicate that the authentication performed by the UE on the first message succeeds.

In an implementation, when starting the user plane security protection, the processing unit 2602 is specifically configured to: start user plane encryption and decryption protection and integrity protection, and then control the sending unit 2603 to send the second message to the SMF; or when starting the user plane security protection, the processing unit 2602 is specifically configured to: start user plane downlink decryption protection and integrity protection, then control the sending unit 2603 to send the second message to the SMF, and finally start user plane uplink encryption protection.

In an implementation, after authentication is performed on the first message based on the security protection information used on the user plane, the processing unit 2602 is further configured to: when the authentication on the first message fails, determine not to start the user plane security protection; and the sending unit 2603 is further configured to: when the authentication performed by the processing unit 2602 on the first message fails, send, to the SMF, a fourth message used to indicate that the authentication performed by the UE on the first message fails.

It should be noted that for specific function descriptions of the foregoing units, refer to the security protection negotiation method provided in Embodiment 1. Details are not described herein again. In this embodiment of this application, unit division is an example, and is merely logical function division. There may be other division manners in actual implementations. The integrated unit may be implemented in a form of hardware, or may be implemented in a form of a software functional unit.

Figure 27:
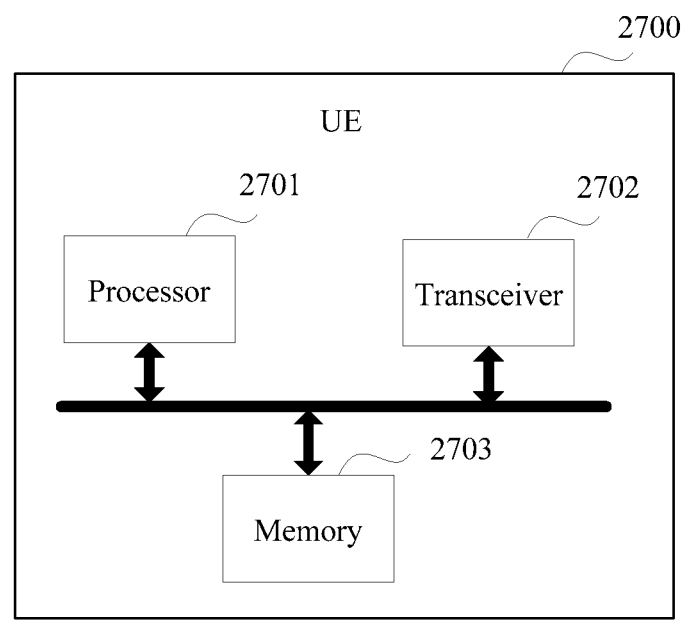
FIG. 27 is a schematic structural diagram of another UE according to an embodiment of the present disclosure.

Based on a same inventive concept, this embodiment of this disclosure further provides UE. The UE can perform, on a UE side, the security protection negotiation method provided in Embodiment 1, and may be a same device as the UE shown in FIG. 26. Referring to FIG. 27, the UE 2700 includes a processor 2701, a transceiver 2702, and a memory 2703.

The processor 2701 is configured to read a program in the memory 2703, to perform the following process.

The processor 2701 is configured to control the transceiver 2702 to receive a first message that is sent by a session management function SMF and that includes security protection information used on a user plane in a current session process, where the security protection information includes a security protection algorithm, an index used to identify a security protection context, and a message authentication code, the security protection includes encryption and decryption protection and integrity protection, and the message authentication code is an authentication code generated after the SMF performs integrity protection on the first message by using an integrity protection algorithm and an integrity protection key that is included in the security protection context identified by using the index.

The processor 2701 is further configured to: perform authentication on the first message based on the security protection information used on the user plane, and when the authentication on the first message succeeds, start user plane security protection, and control the transceiver 2702 to send, to the SMF, a second message used to indicate that the authentication performed by the UE on the first message succeeds.

In an implementation, when starting the user plane security protection, and controlling the transceiver 2702 to send, to the SMF, the second message used to indicate that the authentication performed by the UE on the first message succeeds, the processor 2701 is specifically configured to: start user plane encryption and decryption protection and integrity protection, and then control the transceiver 2702 to send the second message to the SMF; or when starting the user plane security protection, and controlling the transceiver 2702 to send, to the SMF, the second message used to indicate that the authentication performed by the UE on the first message succeeds, the processor 2701 is specifically configured to: start user plane downlink decryption protection and integrity protection, then control the transceiver 2702 to send the second message to the SMF, and finally start user plane uplink encryption protection.

In an implementation, after authentication is performed on the first message based on the security protection information used on the user plane, the processor 2701 is further configured to: when the authentication on the first message fails, determine not to start the user plane security protection, and control the transceiver 2702 to send, to the SMF, a fourth message used to indicate that the authentication performed by the UE on the first message fails.

The memory 2703 may store data used by the processor 2701 when the processor 2701 performs an operation. The memory 2703 may be an internal memory of a physical host that carries an SDN controller, for example, a hard disk, a USB flash drive, or an SD card.

This embodiment further provides a computer storage medium, configured to store a computer software instruction used by the UE in the foregoing embodiments. The computer software instruction includes a program designed for performing the foregoing embodiments.

Embodiment 4

Figure 28:
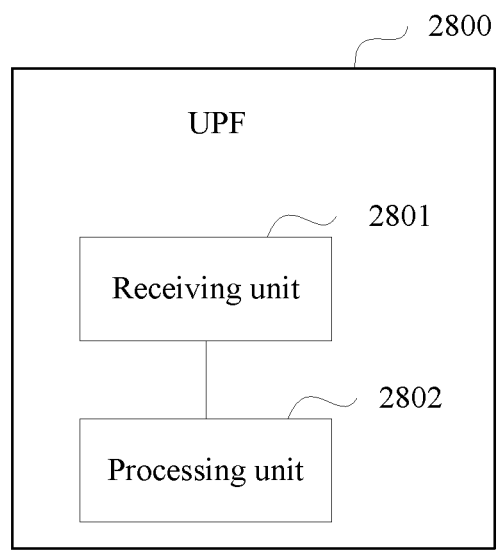
FIG. 28 is a schematic structural diagram of a UPF according to an embodiment of the present disclosure.

Based on a same inventive concept, this embodiment of this disclosure further provides a user plane function UPF. The UPF can perform, on a UPF side, the security protection negotiation method provided in Embodiment 1. Referring to FIG. 28, the UPF 2800 includes a receiving unit 2801 and a processing unit 2802.

The receiving unit 2801 is configured to receive a third message that is sent by a session management function SMF and that includes a security protection algorithm and a security protection context that are used on a user plane in a current session process, where the third message is used to instruct the UPF to start user plane security protection based on the security protection algorithm and the security protection context, and security protection includes encryption and decryption protection and integrity protection.

The processing unit 2802 is configured to start the user plane security protection according to an instruction of the third message received by the receiving unit 2801.

In an implementation, when receiving the third message that is sent by the SMF and that includes the security protection algorithm and the security protection context that are used on the user plane in the current session process, the receiving unit 2801 is specifically configured to:

after the SMF determines that UE starts user plane security protection, receive the third message sent by the SMF; or after the SMF sends, to UE, security protection information used on the user plane in the current session process, receive a first trigger message sent by the SMF, where the first trigger message is used to trigger the UPF to start user plane downlink encryption protection and integrity protection; and after the SMF determines that the UE starts user plane security protection, receive a second trigger message sent by the SMF, where the second trigger message is used to trigger the UPF to start user plane uplink decryption protection.

It should be noted that for specific function descriptions of the foregoing units, refer to the security protection negotiation method provided in Embodiment 1. Details are not described herein again. In this embodiment of this application, unit division is an example, and is merely logical function division. There may be other division manners in actual implementations. The integrated unit may be implemented in a form of hardware, or may be implemented in a form of a software functional unit.

Figure 29:
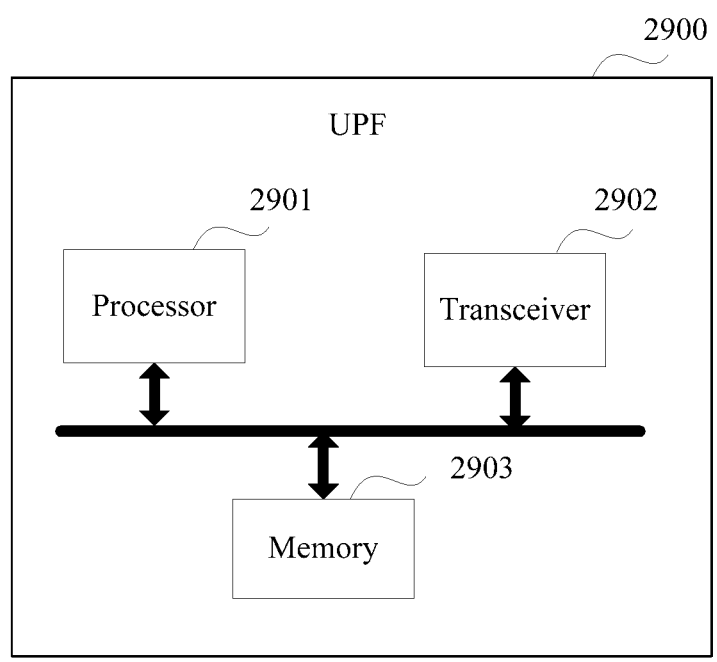
FIG. 29 is a schematic structural diagram of another UPF according to an embodiment of the present disclosure.

Based on a same inventive concept, this embodiment of this disclosure further provides a UPF. The UPF can perform, on a UPF side, the security protection negotiation method provided in Embodiment 1, and may be a same network element as the UPF shown in FIG. 28. Referring to FIG. 29, the UPF 2900 includes a processor 2901, a transceiver 2902, and a memory 2903.

The processor 2901 is configured to read a program in the memory 2903, to perform the following process.

The processor 2901 is configured to control the transceiver 2902 to receive a third message that is sent by a session management function SMF and that includes a security protection algorithm and a security protection context that are used on a user plane in a current session process, where the third message is used to instruct the UPF to start user plane security protection based on the security protection algorithm and the security protection context, and security protection includes encryption and decryption protection and integrity protection.

The processor 2901 is further configured to start the user plane security protection according to an instruction of the third message.

In an implementation, when controlling the transceiver 2902 to receive the third message that is sent by the SMF and that includes the security protection algorithm and the security protection context that are used on the user plane in the current session process, the processor 2901 is specifically configured to:

after the SMF determines that UE starts user plane security protection, control the transceiver 2902 to receive the third message sent by the SMF; or after the SMF sends, to UE, security protection information used on the user plane in the current session process, control the transceiver 2902 to receive a first trigger message sent by the SMF, where the first trigger message is used to trigger the UPF to start user plane downlink encryption protection and integrity protection; and after the SMF determines that the UE starts user plane security protection, control the transceiver 2902 to receive a second trigger message sent by the SMF, where the second trigger message is used to trigger the UPF to start user plane uplink decryption protection.

The memory 2903 may store data used by the processor 2901 when the processor 2901 performs an operation. The memory 2903 may be an internal memory of a physical host that carries an SDN controller, for example, a hard disk, a USB flash drive, or an SD card.

This embodiment further provides a computer storage medium, configured to store a computer software instruction used by the UPF in the foregoing embodiments. The computer software instruction includes a program designed for performing the foregoing embodiments.

Persons skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a CD-ROM, an optical memory, and the like) that include computer-usable program code.

This disclosure is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this disclosure have been described, persons skilled in the art can make changes and modifications to these embodiments once they learn the basic inventive concept. Therefore, the appended claims are intended to be construed as to cover the preferred embodiments and all changes and modifications falling within the scope of this application.

Apparently, persons skilled in the art can make various modifications and variations to the embodiments of this disclosure without departing from the spirit and scope of the embodiments of this application. This disclosure is intended to cover these modifications and variations provided that they fall within the scope of the claims of this disclosure and their equivalent technologies.

The invention claimed is:

1. A security protection negotiation method, comprising:
determining, by a session management function (SMF), security protection information used on a user plane in a current session, wherein the security protection information comprises a security protection algorithm, an index for identifying a security protection context, and a message authentication code, the security protection algorithm comprising an encryption and decryption protection algorithm and an integrity protection algorithm, and the message authentication code being an authentication code generated after the SMF performs the integrity protection algorithm on a first message comprising the security protection information using an integrity protection key contained in the security protection context;

sending, by the SMF to UE, the first message, wherein the UE uses the security protection information to start user plane security protection after an integrity protection authentication performed by the UE on the first message has been successful; and receiving, by the SMF, a second message sent by the UE indicating that the integrity protection authentication performed by the UE on the first message has been successful; and sending to a user plane function (UPF) a third message comprising the security protection algorithm and the security protection context, wherein the third message is used to trigger the UPF to start the user plane security protection based on the security protection algorithm and the security protection context.

2. The method according to claim 1, wherein determining the security protection information comprises:
obtaining, by the SMF from a security policy control function (SPCF), the security protection algorithm determined by the SPCF through negotiation.

3. The method according to claim 2, wherein the SPCF is deployed on any one of the SMF, a security anchor function (SEAF), and an authentication server function (AUSF), or the (SPCF) is independently deployed on a network.

4. The method according to claim 1, wherein the security protection algorithm is determined through negotiation based on a security protection algorithm supported by the UE, a security protection algorithm supported by a network, and a security protection algorithm supported by a service to which the current session belongs.

5. The method according to claim 1, further comprising, prior to determining the security protection information: setting up, by the SMF, the current session.

6. The method according to claim 5, further comprising, after the receiving, by the SMF, a session setup request message that is sent by the UE and that is used to request to set up the current session:
determining, by the SMF, that a security termination point of the user plane is the UPF; and
notifying a radio access network (RAN) that the SMF performs a security protection negotiation process.

7. The method according to claim 1, further comprising, after the sending the first message:
receiving, by the SMF, a fourth message sent by the UE indicating a failure of the integrity protection authentication performed by the UE on the first message; and
determining, by the SMF according to an indication of the fourth message, that the UPF does not need to be triggered to start the user plane security protection.

8. A security protection negotiation method, comprising:
receiving, by user equipment (UE), a first message sent by a session management function (SMF) comprising security protection information used on a user plane in a current session, wherein the security protection information comprises a security protection algorithm, an index identifying a security protection context, and a message authentication code, the security protection algorithm comprising an encryption and decryption protection algorithm and an integrity protection algorithm, and the message authentication code being an authentication code generated after the SMF performs the integrity protection algorithm on the first message using an integrity protection key contained in the security protection context;
performing, by the UE, authentication on the first message based on the security protection information; and
determining that the authentication performed by the UE on the first message is successful: starting, by the UE, user plane security protection, and sending, to the SMF, a second message indicating the authentication performed by the UE on the first message has been successful.

9. The method according to claim 8, wherein starting the user plane security protection and sending the second message comprises:
starting, by the UE, the encryption and decryption protection algorithm and the integrity protection algorithm; and
sending, to the SMF, the second message indicating that the authentication performed by the UE on the first message is successful; or
starting, by the UE, a user plane downlink decryption protection algorithm and the integrity protection algorithm;
sending, to the SMF, the second message indicating that the authentication performed by the UE on the first message is successful, and
starting user plane uplink encryption protection.

10. The method according to claim 8, further comprising, after performing, the authentication:
determining that the authentication performed by the UE on the first message fails:
determining, by the UE, not to start the user plane security protection; and
sending, to the SMF, a fourth message indicating a failure of the authentication.

11. A session management function (SMF), comprising:
a processor configured to determine security protection information used on a user plane in a current session, wherein the security protection information comprises a security protection algorithm, an index for identifying a security protection context, and a message authentication code, the security protection algorithm comprising an encryption and decryption protection algorithm and an integrity protection algorithm, and the message authentication code being an authentication code generated after the integrity protection algorithm is performed on a first message comprising the security protection information by using an integrity protection key contained in the security protection context;
a transceiver configured to send to user equipment (UE) the first message, wherein the UE uses the security protection information to start user plane security protection after the UE determines a successful authentication of the first message based on the security protection information; and
the transceiver, configured to receive a second message sent by the UE indicating the successful authentication, wherein
the transceiver is further configured to send, to a user plane function (UPF), a third message comprising the security protection algorithm and the security protection context that are determined by the processing unit and that are used on the user plane in the current session, wherein the third message is used to trigger the UPF to start user plane security protection based on the security protection algorithm and the security protection context.

12. The SMF according to claim 11, wherein when determining the security protection algorithm, the processor is configured to:
obtain, from a security policy control function (SPCF), the security protection algorithm determined by the SPCF through negotiation.

13. The SMF according to claim 12, wherein the SPCF is deployed on any one of the SMF, a security anchor function (SEAF), and an authentication server function (AUSF); or the SPCF is independently deployed on a network.

14. The SMF according to claim 11, wherein the security protection algorithm is determined through negotiation based on a security protection algorithm supported by the UE, a security protection algorithm supported by a network, and a security protection algorithm supported by a service to which the current session belongs.

15. The SMF according to claim 11, wherein the processor is further configured to set up the current session before determining the security protection information used on the user plane.

16. The SMF according to claim 15, wherein the processor is further configured to: after the receiving unit receives a session setup request message that is sent by the UE and that is used to request to set up the current session, determine that a security termination point of the user plane is the UPF; and the transceiver is further configured to: after the processing unit determines that the security termination point of the user plane is the UPF, send, to a radio access network (RAN), a notification message causing the SMF to perform a security protection negotiation process.

17. The SMF according to claim 11, wherein the transceiver is further configured to: after the sending unit sends to the UE the first message, receive a fourth message sent by the UE indicating a failure of the authentication performed by the UE on the first message; and the processor is further configured to determine, according to an indication of the fourth message received by the receiving unit, that the UPF does not need to be triggered to start the user plane security protection.

* * * * *